United States Patent
O'Connor et al.

(10) Patent No.: US 11,423,491 B1
(45) Date of Patent: Aug. 23, 2022

(54) TRANSACTING VIA SOCIAL MEDIA INTERACTIONS

(71) Applicant: Block, Inc., San Francisco, CA (US)

(72) Inventors: Matthew O'Connor, New York, NY (US); Roshan Jhunja, Scarsdale, NY (US); Daniel Meyers, New York, NY (US)

(73) Assignee: Block, Inc., San Francisco, CA (US)

(*) Notice: Subject to any disclaimer, the term of this patent is extended or adjusted under 35 U.S.C. 154(b) by 136 days.

(21) Appl. No.: 16/583,117

(22) Filed: Sep. 25, 2019

Related U.S. Application Data

(60) Provisional application No. 62/881,806, filed on Aug. 1, 2019.

(51) Int. Cl.
| | |
|---|---|
| *G06Q 30/00* | (2012.01) |
| *G06Q 50/00* | (2012.01) |
| *G06Q 20/42* | (2012.01) |
| *G06Q 20/08* | (2012.01) |
| *G06Q 30/08* | (2012.01) |
| *G06Q 30/02* | (2012.01) |
| *G06Q 20/12* | (2012.01) |
| *G06Q 20/32* | (2012.01) |
| *G06Q 10/08* | (2012.01) |

(52) U.S. Cl.
CPC ......... *G06Q 50/01* (2013.01); *G06Q 20/0855* (2013.01); *G06Q 20/12* (2013.01); *G06Q 20/3223* (2013.01); *G06Q 20/425* (2013.01); *G06Q 30/0283* (2013.01); *G06Q 30/08* (2013.01); *G06Q 10/087* (2013.01)

(58) Field of Classification Search
CPC .... G06Q 50/01; G06Q 20/12; G06Q 20/0855; G06Q 20/3223; G06Q 20/425; G06Q 30/0283; G06Q 30/08; G06Q 10/087
USPC .............................................. 705/26.3
See application file for complete search history.

(56) References Cited

U.S. PATENT DOCUMENTS

| | | |
|---|---|---|
| 7,568,200 B2 | 7/2009 | Weiss |
| 7,891,562 B1 | 2/2011 | Saltzman et al. |
| 8,392,276 B1 | 3/2013 | Saltzman et al. |
| 9,965,796 B2 * | 5/2018 | Dhar .................. G06Q 30/0633 |

(Continued)

OTHER PUBLICATIONS

Non-Final Office Action dated Sep. 16, 2021, for U.S. Appl. No. 16/573,975, of O'Connor M., et al., filed Sep. 25, 2019.

(Continued)

*Primary Examiner* — Mila Airapetian
(74) *Attorney, Agent, or Firm* — Lee & Hayes, P.C.

(57) ABSTRACT

Techniques described herein are directed to transacting via social media interactions. In an example, content posted by a first user of a social media service provider and/or response(s) to the content posted by the first user of the social media service can be analyzed by computing system(s) of a payment processing service provider. The response(s) can be associated with second user(s) of the social media service provider. The computing system(s) can determine, based at least in part on the analyzing, an intent of at least the first user or the second user(s) to participate in a transaction for an item depicted in the content and can create a record indicating that item(s) depicted in the content are available for purchase by the second user(s). The record can be created at or near a time that the content is posted by the first user and used for facilitating the transaction.

20 Claims, 13 Drawing Sheets

(56) References Cited

U.S. PATENT DOCUMENTS

| | | | | |
|---|---|---|---|---|
| 10,672,059 B2* | 6/2020 | Dhar | .................. | G06Q 20/12 |
| 2010/0250382 A1* | 9/2010 | Babaria | .................. | G06Q 40/12 |
| | | | | 705/26.1 |
| 2012/0166267 A1* | 6/2012 | Beatty | .................. | G06Q 30/0219 |
| | | | | 705/14.21 |
| 2013/0290149 A1* | 10/2013 | Rashwan | .................. | G06Q 30/0641 |
| | | | | 705/27.1 |
| 2014/0052587 A1* | 2/2014 | Bereck | .................. | G06Q 30/0641 |
| | | | | 705/27.1 |
| 2015/0379615 A1* | 12/2015 | Dhar | .................. | G06Q 30/0633 |
| | | | | 705/26.8 |
| 2019/0034998 A1* | 1/2019 | Dhar | .................. | G06Q 50/01 |
| 2020/0294115 A1* | 9/2020 | Dhar | .................. | G06Q 50/01 |

OTHER PUBLICATIONS

"EIC 3600 Search Report", Scientific & Technical Information Center, dated Mar. 3, 2022, 4 pages.

Final Office Action dated Mar. 24, 2022, for U.S. Appl. No. 16/573,975, of O'Connor M., et al., filed Sep. 25, 2019.

Advisory Action dated Jun. 2, 2022, for U.S. Appl. No. 16/573,975, of O'Connor M., et al., filed Sep. 25, 2019.

* cited by examiner

TRANSACTING VIA SOCIAL MEDIA INTERACTIONS

PRIORITY APPLICATION

This application claims priority to U.S. Provisional Patent Application No. 62/881,806, filed on Aug. 1, 2019, the entire contents of which are incorporated by reference herein.

TECHNICAL FIELD

Social media refers to websites, applications, and other network-based communication tools that are designed to enable users to interact with each other by both sharing and consuming information quickly, efficiently, and in real-time. Often users leverage social media tools for online commerce ("ecommerce"). For instance, a user can post an image of an item he or she is selling to a social media application so that his or her followers, friends, or other users of the social media application can offer to purchase the item.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
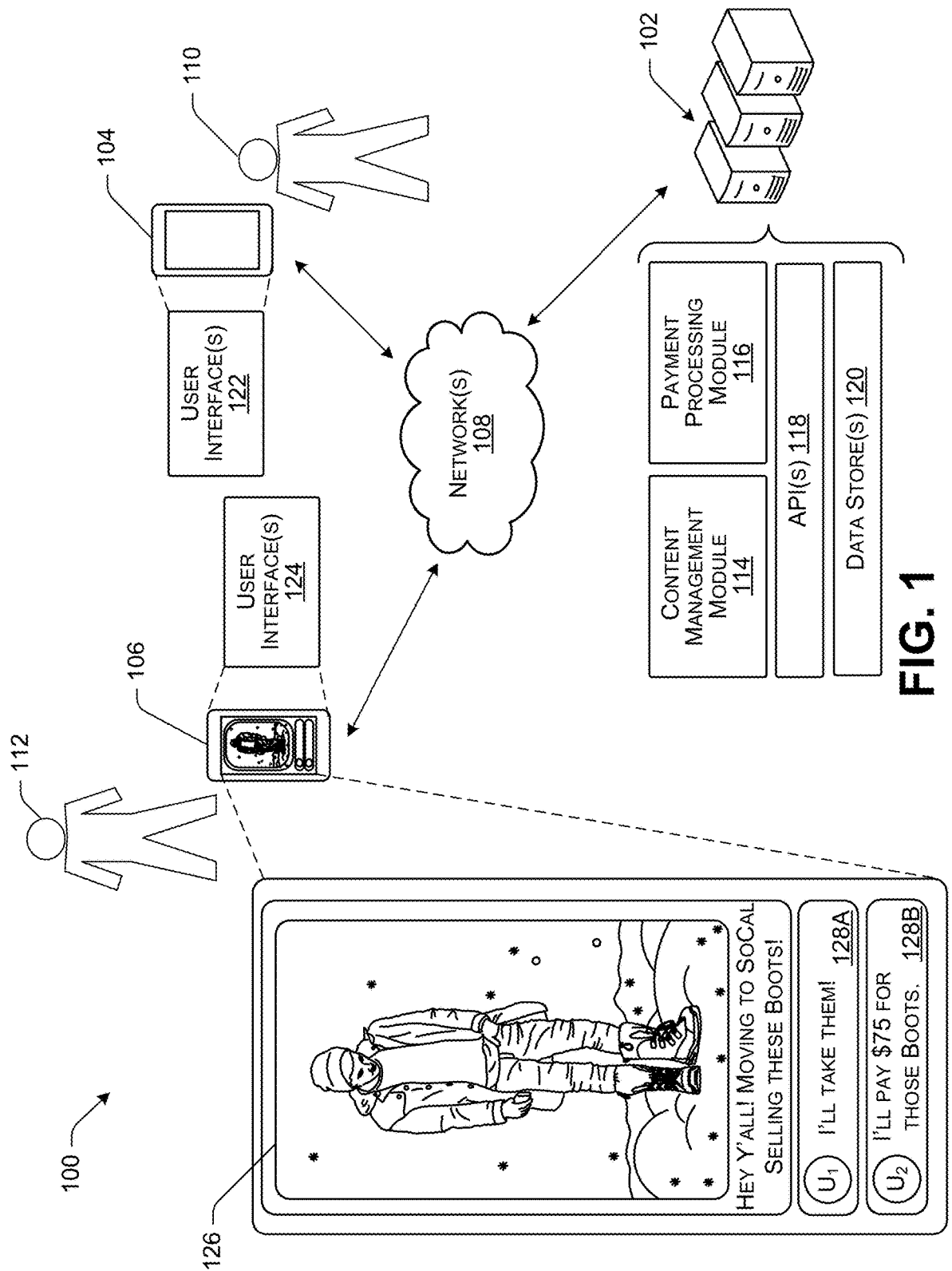
FIG. 1 illustrates an example environment for facilitating transactions via social media interactions.

Techniques described herein are directed to transacting via social media interactions. For example, a user (e.g., a seller) can post an image, video, or the like (hereinafter "content") via a social media platform. Such content can depict item(s) (e.g., goods and/or services). In some examples, the content can be associated with an intent to sell an item depicted in the content (e.g., text associated with an image indicating that the user is looking to sell an item depicted in the content). In other examples, the content may not be associated with an intent to sell (e.g., no explicit or implicit indication that the user desires to sell anything depicted in the content).

Other users can respond to the post, for instance via comment, interaction with a button or other actuation mechanism (e.g., like, dislike, funny, love, etc.), and so on. Interested users can provide indicators indicating their desire to purchase item(s) depicted in the content. For instance, a user can comment "mine" or "I want to buy that [item]." The responses can be analyzed by a payment processing service provider. The payment processing service provider can identify an interested user, access payment information for the user, and/or process payment for the item. That is, the payment processing service provider can facilitate a transaction between the buyer and the seller for an item depicted in the content posted via the social media platform.

In at least one example, techniques described herein alleviate the need for users interested in selling via social media platforms to perform any action that they usually wouldn't perform prior to posting content to social media platforms. That is, users interested in selling via social media platforms can simply post content to one or more social media platforms and techniques described herein are directed to creating selling opportunities and facilitating transactions based on such content.

Take for example, a user posts an image of her meal to a social media platform. Techniques described herein would take no action at the time the image is posted (assuming the user doesn't intend to sell her meal). However, if a user posts an image of a pair of tickets with accompanying descriptive text that indicates that the user is interested in selling the tickets, techniques described herein can begin to monitor responses to the post. For instance, a payment processing service provider can use natural language processing, image recognition, or other machine-trained mechanisms, to analyze responses to the post. If a response includes an indicator indicating that the user who posted the response desires to purchase the tickets (e.g., "I'll take them!" or the like), the payment processing service provider can access payment information and process a transaction, as described above. In such an example, the payment processing service provider can create a record of the item that is for sale (e.g., the pair of tickets) at or near the same time that the image is posted. That record can be used to facilitate the transaction, as described below. Thus, in such an example, if a user posts content that is associated with an intent to sell, the payment processing service provider can create a record of item(s)

associated with the content at or near the same time that the content is posted and can monitor responses to facilitate a transaction. In at least one example, such a record can be used to generate a dedicated webpage and/or link to facilitate a transaction and/or can be used to convert the original post into a post that includes buyable links.

In another example, a user can post an image of her front porch, which includes several planters of flowers. In such an example, the user may not provide any indication that the user intends to sell any of the planters of flowers (e.g., because she may not intend to sell any of her planters of flowers at the time the image is posted). As such, techniques described herein would take no action at the time the user posted the image of her front porch (much like the meal example described above). However, one or more other users may respond to her post with comments that indicate an intention to purchase an item depicted in the image. In such an example, techniques described herein can begin to monitor such comments and, in some examples, create a record of the item depicted in the image. That is, based at least in part on detecting a purchasing intent, the payment processing service provider can create a record of an item depicted in the image. As described above, in at least one example, such a record can be used to generate a dedicated webpage and/or link to facilitate a transaction and/or can be used to convert the original post into a post that includes buyable links. A variation of this example is also contemplated here where the user may identify the planter, but not the doormat that sits next to it. Through the methods and systems described herein, both items can be tagged for sale based on context of the post, and other data related to the user. The contextual data indicates whether the user intends to sell, buy, offer for bid, and so on.

In some examples, the payment processing service provider can prompt the user to list the item for sale prior to creating the record. For example, the payment processing service provider can send a notification to the user (e.g., a computing device associated therewith) informing the user that there are other user(s) interested in purchasing the planters. In some examples, such a notification can include the number of interested users, price(s) offered, or other information indicative of the extent that other user(s) are interested in purchasing the planters. Such a notification can be used to incentivize the user to list the item for sale. The user can respond to the notification, indicating whether she agrees to list the item for sale (or not). In some examples, the user can indicate that she wants to put the item up for auction such that the highest bidder can purchase the item. In other examples, the user can indicate that she desires to sell to a user who previously commented on her post. Regardless, the payment processing service provider can use the record to facilitate a transaction between the seller and the buyer, as described below.

As described above, the payment processing service provider can identify purchasing intent of other users and can create a selling opportunity even when one did not originally exist (e.g., at the time the content was posted). That is, if a user posts content that is not associated with an intent to sell, the payment processing service provider can nevertheless create a record of item(s) associated with the content at some time after the content is posted and can monitor responses to facilitate a transaction.

As described above, users of social media platforms (e.g., websites, applications, and other network-based communication tools provided by social media service providers) leverage social media tools for online commerce ("ecommerce"). However, current technology has limitations, as described above. In some examples, a user interested in purchasing an item posted via social media is required to follow-up with the seller via another communication tool (e.g., email, text message, private message, etc.) to coordinate the purchase. Such systems introduce unnecessary lag due to response times associated with the users. Furthermore, the current infrastructure does not allow automatic filtering of the users and puts the onus on the seller on whether to initiate a conversation with the interested users, engage in a financial transaction with them, and so on. In other examples, a user is directed to a webpage (usually different from the webpage or platform where the interaction originated) where the user is then required to add an item to a virtual cart and provide payment data to complete an online transaction. As such, a social media platform has to establish communication interfaces between disparate platforms, for example between a social media platform (that allows interaction between two users) and a payment platform (that facilitates payment transactions). These communication interfaces have to meet security protocols to allow secure communications, such as exchange of financial data. Existing technology also introduces friction when users intend to purchase items via social media platforms. That is, users—both buyers and sellers—are required to perform multiple actions to facilitate a transaction, which can include multiple exchanges of communications, multiple clicks through multiple web pages, interactions or sign-ups with multiple platforms, or the like. As such, current technology is inefficient and is not user friendly. Techniques described herein enable frictionless (or near-frictionless) transactions via interactions with social media content. Thus, techniques described herein offer improvements to existing technology.

In some examples, existing techniques directed to comment selling allow sellers to post images of items available for sale via social media platforms, harvest comments, and turn such comments into invoices. However, in such examples, existing techniques require users to create records for items to be sold via social media posts prior to posting the items via social media platforms. That is, existing techniques require users to provide an image, description of the image, quantity available, sizes (if applicable), etc. Such information is used to create content that can be posted to a social media platform, with an identifier to identify a previously created record. Users can comment when they want to purchase an item and the previously created record can be used to create an invoice and facilitate a transaction. That is, existing techniques require users to perform various actions prior to posting content to a social media platform. For instance, sellers are required to input a significant amount of information prior to posting content to social media platforms. As such, existing techniques require the storage of such content and associated records and introduce unnecessary lag due to time required to input such information and otherwise set up records. Techniques described herein offer improvements to current technology by alleviating required actions prior to posting content via social media platforms. In at least one example, techniques described herein reduce storage requirements by enabling record(s) of item(s) associated with the content to be created at some time after the content is posted (e.g., without the seller(s) having implicitly or explicitly indicated an intent to sell). Furthermore, techniques described herein enable users to use social media platforms consistent with how social media platforms are intended to be used, without requiring additional actions to be performed before content is shared. That is, techniques described herein can alleviate the need for a social media platform to establish communication interfaces between disparate platforms yet can offer the ability for sellers to sell items via a social media platform using secure communications. As such, techniques described herein are directed to improvements over existing technologies.

FIG. 1 illustrates an example environment 100 for facilitating transactions via social media interactions. In FIG. 1, server(s) 102 can be associated with a payment processing service provider, which can communicate with user computing devices, such as a seller device 104 and a buyer device 106, via network(s) 108. That is, the seller device 104 and the buyer device 106 are network-connected devices that enable end users (e.g., a seller 110 and a buyer 112, respectively) to access services provided by the payment processing service provider (e.g., via the server(s) 102). Additional details associated with the server(s) 102, the user computing devices (e.g., 104, 106), and the network(s) 108 are described below with reference to FIGS. 14 and 15.

In at least one example, the server(s) 102 can include a content management module 114 and a payment processing module 116. The content management module 114 can analyze content and associated responses to set-up and/or facilitate transactions. The payment processing module 116 can, among other things, process resulting transactions. That is, in at least one example, the payment processing module 116 can access payment data associated with a user, send a request for authorization of the payment data to a payment service provider, and process a transaction based on a response from the payment service provider. In other examples, the payment processing module 116 can access an account maintained by the payment processing service provider and can use funds associated with the account to process a transaction. Additional details associated with both the content management module 114 and the payment processing module 116 are described below.

In at least one example, the payment processing service provider can expose functionality and/or services via one or more APIs 118, thereby enabling functionality and/or services described herein to be integrated into various functional components of the environment 100. The API(s) 118, which can be associated with the server(s) 102, can expose content management functionality and/or avail payment processing services to various functional components associated with the environment 100. At least one of the API(s) 118 can be a private API, thereby availing services and/or functionalities to functional components (e.g., applications, etc.) that are developed internally (e.g., by developers associated with the payment processing service provider). At least one of the API(s) 118 can be an open or public API, which is a publicly available API that provides third-party developers (e.g., social media service providers described herein) with programmatic access to a proprietary software application or web service of the payment processing service provider. That is, the open or public API(s) can enable functionality and/or services of the payment processing service provider to be integrated into social media platforms. The API(s) 118 can include sets of requirements that govern how applications, or other functional components, can interact with one another.

In some examples, the payment processing service provider can provide third-party entities with a software developer kit ("SDK") that may utilize functionality exposed by the API(s) 118. The SDK can include software development tools that allow a third-party developer (i.e., a developer that is separate from the payment processing service provider) to include functionality and/or avail services as described herein. The SDK and/or the API(s) 118 may include one or more libraries, programming code, executables, other utilities, and documentation that allows a developer to directly include functionality and/or avail services described herein within an application, such as third-party applications providing social networking services, as described herein.

In at least one example, the server(s) 102 can include, or otherwise have access to, data store(s) 120. The data store(s) 120 can store, among other types of data, user profiles and inventory records. For instance, a user profile of the buyer 112 can store payment data associated with payment instrument(s) of the buyer 112. In some examples, an account maintained by the payment processing service provider on behalf of the buyer 112 can be mapped to, or otherwise associated with, the user profile of the buyer 112. Such an account can store funds received from peer-to-peer payment transactions, deposits from employers, transfers from other accounts of the buyer 112, and so on. Additionally or alternatively, a user profile of the seller 110 can be mapped to, or otherwise associated with, an account of the seller (which can be maintained by the payment processing service provider, a bank, or another payment service). Additional details are provided below.

As illustrated in FIG. 1, the seller device 104 is associated with user interface(s) 122 that enable the seller 110 to interact with the seller device 104. The user interface(s) 122 can be presented via web browsers, applications (e.g., desktop or otherwise dedicated, provided by the payment processing provider, provided by a third-party, etc.), or the like to enable the seller 110 to access functionality and/or services as described herein. Similarly, the buyer device 106 can be associated with user interface(s) 124 which can be presented via web browsers, applications (e.g., desktop or otherwise dedicated, provided by the payment processing provider, provided by a third-party, etc.), or the like to enable the buyer 112 to interact with the buyer device 106 and access functionality and/or services as described herein.

In at least one example, a user interface of the user interface(s) 122 can be presented via a social media platform (e.g., website, application, etc.) associated with a social media service provider. Functionality and/or services of the payment processing service provider can be integrated into the social media platform via the API(s) 118 and/or SDKs. In at least one example, the seller 110 can post content via the social media platform. In FIG. 1, the content is an image 126, but in additional or alternative examples, the content can be a video or any other type of content. In at least one example, the buyer 112 can access and/or consume the content via a user interface of the user interface(s) 124 that is presented via the social media platform. That is, the seller 110 and the buyer 112 can each access the social media platform via user interfaces presented via their respective devices.

In at least one example, one or more users can respond to content, for example, via comments (which can include text, images, emojis, etc.), interactions with a button or other actuation mechanism (e.g., like, dislike, funny, love, etc.), and so on. Such responses can be posted in near real-time. For instance, one or more users can respond to the image 126 posed by the seller 110. Two comments 128A and 128B are illustrated in FIG. 1. However, any number of responses can be associated with posted content, such as the image 126.

In at least one example, the content management module 114 can monitor content (and associated responses) posted via the social media platform. The content management module 114 can use an automated program that runs over the network(s) 108 (e.g., a "bot," a web crawler, etc.) and/or natural language processing, image recognition, and/or other machine-trained mechanisms to determine whether content posted via the social media platform indicates an intent to sell item(s) depicted in the content. That is, the content management module 114 can utilize the mechanisms described above to analyze content (and associated responses) systematically (or not) over time. For the purpose of this discussion, a user "posts" content to a social media platform when the user publishes the content for other users to consume.

In FIG. 1, the seller 110 posts the image 126 with the intent to sell an item (e.g., boots) in the image 126. As shown, the seller 110 included text indicating that he is moving and is "selling these boots." In at least one example, when the seller 110 posts the image 126 (e.g., publishes the image 126 via the social media platform), the content management module 114 can determine that the seller 110 intends to sell an item in the image 126. In such an example, the seller 110 can explicitly indicate an intent to sell the item, but the image 126 may not be associated with any mechanism that enables a buyer to purchase the item via an interaction with the image 126 (or associated post). That is, the image 126 may not be associated with a direct sell option (e.g., with an actionable link that enables a buyer to purchase item(s) depicted in the image 126) but may be associated with an indirect sell option (e.g., comment or other indicator that the seller 110 desires to sell item(s) depicted in the image 126).

Based at least in part on determining that the image 126 is associated with an intent to sell an item depicted in the image 126, the content management module 114 can create a record for the item (e.g., at or near the same time that the image 126 is posted). In some examples, the content management module 114 can prompt the seller 110 to confirm that the seller 110 desires to sell the item and/or consents to the creation of the record before creating the record. The record can be stored in the data store(s) 120 and can be used to facilitate a transaction for the item, as described below. In at least one example, such a record can be used to generate a dedicated webpage and/or link to facilitate a transaction and/or can be used to convert the original post into a post that includes buyable links.

In some examples, the content management module 114 can auto-populate at least a portion of information at the time the record is created. For example, the content management module 114 can auto-populate information associated with characteristics of the item (e.g., size, color, condition, brand, etc.), which, in some examples, can be based on an image search and/or searches of marketplace(s) where other seller(s), which can be similar to the seller 110 (or not), are selling the item. In some examples, such information can be generated using machine-trained mechanisms, for example, based at least in part on selling activities of the seller 110 and/or other sellers similar to the seller 110. In at least one example, the content management module 114 can prompt the seller 110 for information at the time the record is created. For instance, the content management module 114 can request information associated with characteristics of the item (e.g., size, color, condition, brand, etc.). Furthermore, the content management module 114 can ask the seller 110 whether the seller 110 is looking to sell the item for a particular price (e.g., a minimum price, a fixed price, etc.) or wants to start an auction (e.g., allow users to place bids). In some examples, the content management module 114 can prompt the seller 110 for a period of time for selling the item (e.g., after which the item is no longer to be listed for sale). The content management module 114 can update the record based at least in part on information provided by the seller 110. That is, the record becomes an inventory record for the item. In some examples, the content management module 114 can edit the content to provide additional information associated with the item (e.g., based at least in part on information provided by the seller 110). In at least one example, the content management module 114 can edit the content to provide an instruction regarding a particular indicator to use to purchase the item (e.g., a particular word, image, emoji, etc.), a cost of the item, a length of time the item will be available for sale, and the like. In some examples, the content management module 114 can add a response including such instructions (in addition to, or instead of, editing the content itself). Of note, however, techniques described herein can be implemented with or without additional information provided by the seller 110.

After the record is created, which can be at the same time the content is posted or shortly thereafter, the content management module 114 can monitor responses to the posted content to determine whether such responses include indicator(s) that indicate that other users desire to purchase item(s) in the content (e.g., the image 126). In some examples, the indicator can be prescribed (e.g., comment "mine" to indicate a desire to purchase the item) and the content management module 114 can analyze responses to identify the prescribed indicator. In other examples, the content management module 114 can analyze the responses using natural language processing, image recognition, and/or other machine-trained mechanisms to determine whether any of the responses are associated with an indicator indicating that another user desires to purchase the item. The indicators need not be the same. That is, any indicator indicating the desire of other users to purchase the item can be sufficient for determining that other users are interested in purchasing the item. In the example provided in FIG. 1, a first user (e.g., $U_1$) responded to the image 126 with "I'll take them!" and a second user (e.g., $U_2$) responded with "I'll pay $75 for those boots." For the purpose of this example, the buyer 112 can be the first user. That is, the buyer 112 can interact with the user interface availed via the social media platform to respond to the seller's 110 post.

In at least one example, the content management module 114 can determine that both comment 128A and comment 128B indicate a desire to purchase the item. In some examples, the content management module 114 can utilize a first-in-time rule such that the first user to respond receives the first opportunity to purchase the item. In other examples, the content management module 114 can utilize one or more other criteria to rank (or otherwise prioritize) responding users. Additional details are provided below.

For the purpose of this example, the content management module 114 can utilize the first-in-time rule such that the buyer 112 has the first opportunity to purchase the item. Responsive to the content management module 114 determining that the comment 128A includes an intent to purchase, the content management module 114 can transmit an indication of a transaction to the payment processing module 116.

In some examples, the seller 110 may not have an account with the payment processing service provider. For instance, in at least one example, the content management module 114 can analyze hashtags or other types of metadata tags that enable other users to easily find responses with a specific theme, subject, or content. In at least one example, the content management module 114 can identify content to which techniques described herein are applicable. In such an example, a seller may not be associated with the payment processing service provider. In examples where the seller 110 is not already onboarded with the payment processing service provider, the payment processing module 116 may prompt the seller 110 to provide information to the payment processing module 116 to at least temporarily onboard the seller 110 (e.g., create a user profile for the seller 110). In at least one example, the payment processing module 116 can enable the seller 110 to perform transactions until a threshold is satisfied (e.g., a number of transactions, a dollar amount, etc.). If the seller 110 has not fully onboarded by the time the threshold is satisfied, the payment processing module 116 can request the seller 110 to provide additional information before the seller 110 can further use the payment processing service provider. In any event, the payment processing module 116 can access information associated with the seller 110 to initiate the transaction.

In at least one example, the buyer 112 can store payment data in a user profile in the data store(s) 120. In such an example, the payment processing module 116 can utilize the payment data for processing the transaction. That is, in at least one example, the payment processing module 116 can identify the user (e.g., the buyer 112) associated with the comment 128A and can determine whether the user is associated with a user profile in the data store(s) 120. In some examples, the payment processing module 116 can identify the user (e.g., the buyer 112) based on personal information that has been permissibly shared between the social media service provider and the payment processing service provider (e.g., name, email address, phone number, etc.) and/or personal information shared by the user (e.g., the buyer 112). In a non-limiting example, the user can tag their response with a hashtag or other metadata tag that uniquely identifies the user, and the presence of such a tag can be used to identify the user. If the buyer 112 is associated with a user profile in the data store(s) 120, the payment processing module 116 can then initiate a transaction. That is, the payment processing module 116 can access payment data associated with the buyer 112 and process the transaction using the payment data (and information associated with the record).

In an alternative example, the buyer 112 may not have a user profile in the data store(s) 120 and/or payment data associated with a user profile in the data store(s) 120 is missing, incomplete, or otherwise unusable. In such an example, the payment processing module 116 can send a request for payment information to the buyer device 106. Responsive to the buyer 112 providing payment data, the payment processing module 116 can process the transaction using the payment data (and information associated with the record). In examples where additional information is required to process the transaction (e.g., price), the payment processing module 116 can facilitate communications between the seller 110 and the buyer 112 to obtain the additional information for processing the transaction.

In at least one example, the content management module 114 can reserve the item for the buyer 112 for a predetermined period of time after which, if the buyer 112 has not purchased the item, the content management module 114 can offer the item to a different user. For instance, if the buyer 112 does not purchase the item by the time the predetermined period of time lapses, the content management module 114 can select another responding user to whom to offer the item.

Figure 2:
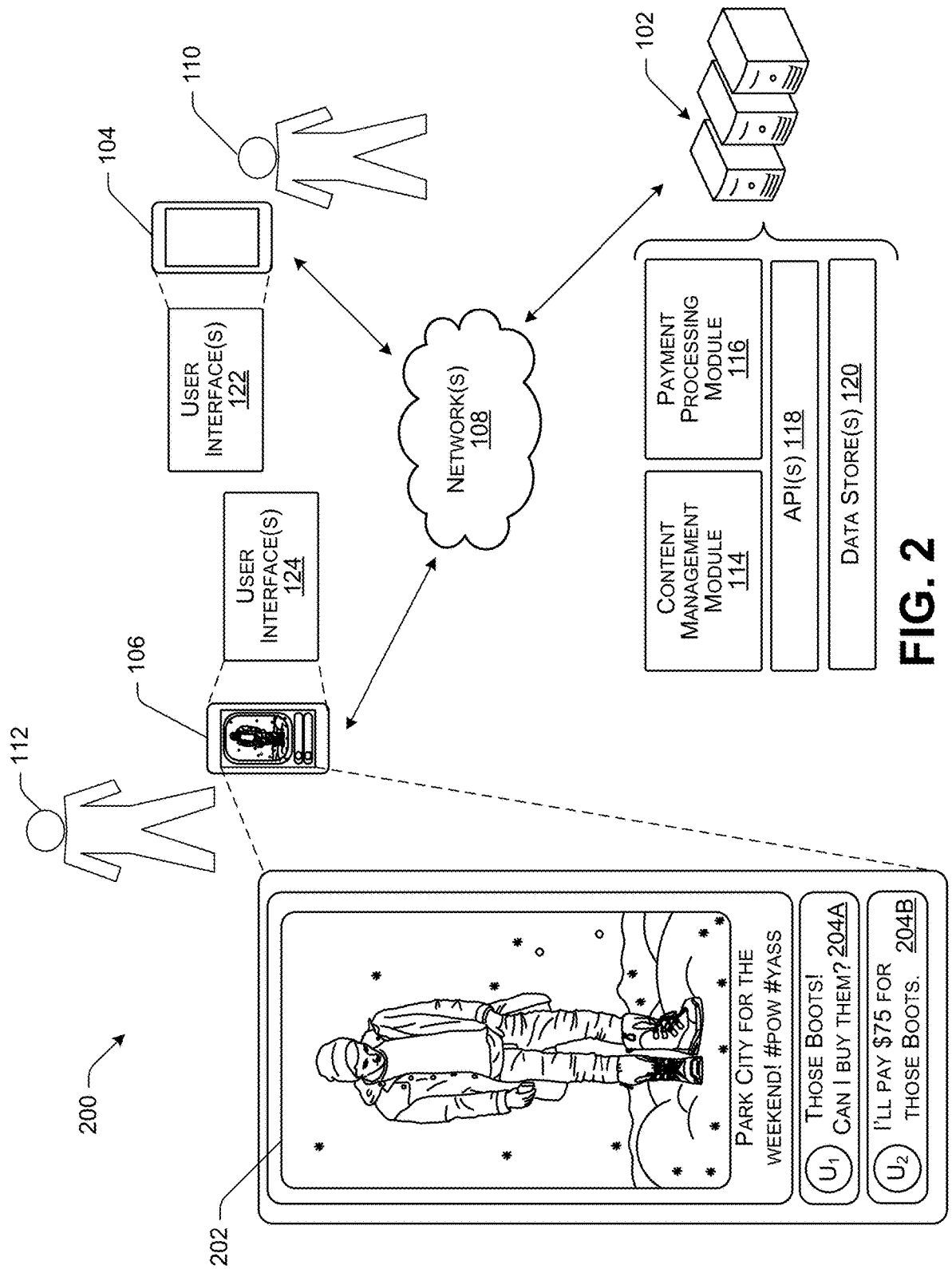
FIG. 2 illustrates an example environment for facilitating transactions via social media interactions.

FIG. 2 illustrates an example environment 200 for facilitating transactions via social media interactions. The environment 200 comprises the same or similar devices as the environment 100 in FIG. 1. That is, the environment 200 can include the server(s) 102, the seller device 104, the buyer device 106, the network(s) 108, and so on. In FIG. 2, however, the seller 110 can post content, such as image 202, without an intention to sell item(s) depicted in the image 202. In such an example, the content management module 114 can refrain from creating a record when the image 202 is posted. As such, the image 202 may not be associated with a direct sell option (e.g., with an actionable link that enables a buyer to purchase item(s) depicted in the image 202) and/or an indirect sell option (e.g., comment or other indicator that the seller 110 desires to sell item(s) depicted in the image 202).

As described above, in at least one example, the content management module 114 can monitor responses to content posted via the social media platform. In at least one example, the content management module 114 can use an automated program that runs over the network(s) 108 (e.g., a "bot," a web crawler, etc.) and/or natural language processing, image recognition, and/or other machine-trained mechanisms to determine which item(s) are of interest to responding users whether such responses indicate intent to purchase item(s) depicted in the content. In some examples, users can respond to content (e.g., via comment, an action associated with a button or other actuation mechanism, etc.) using an indicator indicating that users desire to purchase item(s) in the content, such as the image 202. In some examples, content can depict multiple items. In such examples, the content management module 114 can utilize natural language processing, image recognition, and/or other machine-trained mechanisms to determine which item(s) are of interest to responding users. For example, the image 202 depicts a person wearing a hat, a coat, a top, pants, and boots. The content management module 114 can utilize image recognition to identify each of the items in the image 202. The comments 204A and 204B both reference "boots." As such, the content management module 114 can utilize natural language processing to determine that the responding users are interested in purchasing the "boots" depicted in the image 202.

In the case of video content, the content management module 114 can utilize additional or alternative information such as a timestamp to identify which item(s) are of interest to a responding user. For instance, a timestamp of a response can be compared to a timestamp in a video to determine which item(s) were presented at that timestamp. Additional or alternative means for identifying item(s) in content are within the scope of this disclosure.

In at least one example, the content management module 114 can send a notification to the seller 110 to indicate to the seller 110 that other users are interested in purchasing item(s) in content posted by the seller 110, for example, the seller's 110 boots in FIG. 2. In some examples, the content management module 114 can refrain from sending a notification to the seller 110 until a threshold number of responses indicate an interest in purchasing the item(s) (e.g., the boots). Additionally or alternatively, the content management module 114 can refrain from sending a notification to the seller 110 until a price that meets or exceeds a threshold is proposed by a buyer 112. The seller 110 can respond to the notification with an indication of whether or not the seller 110 desires to list the item(s) (e.g., boots) for sale. Based at least in part on the seller 110 indicating a desire to list the item(s) (e.g., boots) for sale, the content management module 114 can create a record for the item. As described above, the record can be created at or near the time the image 202 is posted by the seller 110. The record can be stored in the data store(s) 120 and can be used to facilitate a transaction for the item, as described above. As described above, in at least one example, such a record can be used to generate a dedicated webpage and/or link to facilitate a transaction and/or can be used to convert the original post into a post that includes buyable links.

As described above, in some examples, the content management module 114 can auto-populate at least a portion of information at the time the record is created. For example, the content management module 114 can auto-populate information associated with characteristics of the item (e.g., size, color, condition, brand, etc.), which, in some examples, can be based on an image search and/or searches of marketplace(s) where other seller(s), which may be similar to the original seller (or not), are selling the item. In some examples, such information can be generated using machine-trained mechanisms, for example, based at least in part on selling activities of the seller 110 and/or other sellers similar to the seller 110. In additional or alternative examples, the content management module 114 can prompt the seller 110 for information at the time the record is created. For instance, the content management module 114 can request information associated with characteristics of the item (e.g., size, color, condition, brand, etc.). Furthermore, the content management module 114 can ask the seller 110 whether the seller 110 is looking for a particular price (e.g., minimum price, fixed price, etc.) or wants to start an auction (e.g., allow users to place bids). In some examples, the content management module 114 can prompt the seller 110 for a period of time for selling the item (e.g., after which the item is no longer to be listed for sale). The content management module 114 can update the record based at least in part on information provided by the seller 110. That is, the record becomes an inventory record for the item. In some examples, the content management module 114 can edit the content to provide additional information associated with the item (e.g., based at least in part on information provided by the seller 110). In at least one example, the content management module 114 can edit the content to provide an instruction regarding a particular indicator to use to purchase the item (e.g., a particular word, image, emoji, etc.), a cost of the item, a length of time the item will be available for sale, and the like. Additionally or alternatively, the content management module 114 can add a response providing the same or similar instructions. Of note, however, techniques described herein can be implemented with or without additional information provided by the seller 110.

In some examples, the seller 110 can opt to sell the item to a user that has already responded to the post of the image 202. For example, the first user to respond may receive the first offer to purchase the item and/or a user who has offered a highest price may receive the first offer to purchase the item. In FIG. 2, the first user (e.g., $U_1$) is the first to respond and the second user (e.g., U2) offered the highest price between comments 204A and 204B. In such examples, the content management module 114 can select a response, identify a user associated with the selected response, and transmit an indication of a transaction to the payment processing module 116. The payment processing module 116 can then initiate a transaction, as described above with reference to FIG. 1.

In other examples, the seller 110 can opt to list the item and allow additional users to respond to the listing, for example, via a new response or an updated response. In such examples, the content management module 114 can monitor additional responses. That is, the content management module 114 can analyze the additional responses (which can include new responses or updated responses) can use an automated program that runs over the network(s) 108 (e.g., a "bot," a web crawler, etc.) and/or natural language processing, image recognition, and/or other machine-trained mechanisms to determine whether any of the additional responses are associated with an indicator indicating that another user desires to purchase the item.

In at least one example, the content management module 114 can determine that a response, such as comment 204A includes an indicator indicating a desire to purchase the item(s) in the content (e.g., the boots). In such an example, the content management module 114 can select a response, identify a user associated with the selected response, and transmit an indication of a transaction to the payment processing module 116. The payment processing module 116 can then initiate a transaction, as described above with reference to FIG. 1.

FIGS. 1 and 2 both enable a user to post content via a social media platform and turn the content into a selling opportunity (e.g., via integration of the payment processing service provider into the social media platform). As described above, in both examples, the payment processing service provider (e.g., the content management module 114) can create a record for an item depicted in a content item at or near the time the content is posted to the social media platform. The posting user (e.g., the seller 110) need not indicate an intent to sell and/or provide a mechanism through which other users (e.g., the buyer 112) can purchase the item at the time the posting user posts the content, although the posting user can do so.

That is, as described above, techniques described herein offer improvements to current technology by alleviating required actions prior to posting content via social media platforms. As such, techniques described herein reduce storage requirements by enabling record(s) of item(s) associated with the content to be created at some time after the content is posted (e.g., without the seller(s) having implicitly or explicitly indicated an intent to sell). Furthermore, techniques described herein enable users to use social media platforms consistent with how social media platforms are intended to be used, without requiring additional actions to be performed before content is shared. That is, techniques described herein can alleviate the need for a social media platform to establish communication interfaces between disparate platforms yet can offer the ability for sellers to sell items via a social media platform using secure communications. As such, techniques described herein are directed to improvements over existing technologies.

In some examples, a user can post content with an intent to sell an item depicted in the content, but another user identifies another item depicted in the content that they are interested in purchasing. That is, an image may be associated with a direct sell option (e.g., with an actionable link that enables a buyer to purchase item(s) depicted in the image) and/or an indirect sell option (e.g., comment or other indicator that the seller desires to sell item(s) depicted in the image). Nevertheless, another user can identify an item in the image (that is neither associated with the direct sell option nor the indirect sell option) that the other user desires to purchase. In such examples, techniques described with reference to FIG. 2 can be implemented despite the fact that the user posted content with an intent to sell initially. That is, in some examples, techniques described above with reference to FIGS. 1 and 2 can be integrated.

FIGS. 1 and 2 are directed to posting content via a single social media platform wherein the payment processing service provider is integrated via the APIs 118 and/or SDKs. However, in some examples, users can post content to multiple social media platforms (in which the payment processing service provider is integrated) and techniques described herein can provide the same functionality and/or services on each social media platform. That is, the seller 110 can post the image 126 or the image 202 via multiple social media platforms at or near the same time. In such examples, the payment processing service provider can monitor responses across the multiple social media platforms to enable transactions via social network interactions. Furthermore, while FIGS. 1 and 2, and the discussion below, describes techniques as they are applicable to social media platforms, techniques described herein can be directed to any platform where two users interact, including, but not limited to, text platforms, email platforms, news aggregation platforms, web discussion platforms, etc.

While FIGS. 1 and 2, and the description below, refer to "selling" opportunities between buyers and sellers, techniques described herein can be applicable to any type of transactions between two users. That is, techniques described herein can be utilized for identifying opportunities to lease, borrow, trade, lend, or otherwise transfer item(s) between users. Furthermore, techniques described herein can be utilized for other transactions, such as scheduling appointments, requesting additional information, and the like. For instance, users can respond to a post with an indicator indicating an intent to schedule an appointment, a request for additional information, and the like. The payment processing service provider can facilitate the scheduling of the appointment, provisioning of additional information, and the like.

Furthermore, while FIGS. 1 and 2 refer to the seller 110 and the buyer 112, both the seller 110 and the buyer 112 can be buyers and/or sellers at any time. That is, both the seller 110 and the buyer 112 are users in the environments 100 and 200, and are not limited to being sellers and buyers, respectively. While "intent to sell" and "desire to purchase"/"intent to purchase" are used herein to describe an intention of seller(s) and buyer(s), respectively; such intents can indicate an intent of the seller(s) and/or the buyer(s) to participate in transaction(s) as such intentions relate to content posted by such seller(s).

Moreover, while FIGS. 1 and 2 are directed to examples where the seller 110 does not post content with a sell option, such as an actionable link to purchase an item depicted in the content (e.g., image 126 and/or image 202), techniques described can be applicable to such implementations. That is, in some examples, techniques described herein can identify additional or alternative selling opportunities in content posted to a social media platform and can enable buyers to purchase items so identified via techniques described herein.

FIGS. 3-9 are flowcharts showing example methods involving techniques as described herein. The methods illustrated in FIGS. 3-9 are described with reference to FIGS. 1, 2, 14, and 15 for convenience and ease of understanding. However, the methods illustrated in FIGS. 3-9 are not limited to being performed using components described in FIGS. 1, 2, 14, and 15, and such components are not limited to performing the methods illustrated in FIGS. 3-9.

The methods 300-900 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 300-900 can be combined in whole or in part with each other or with other methods.

Figure 3:
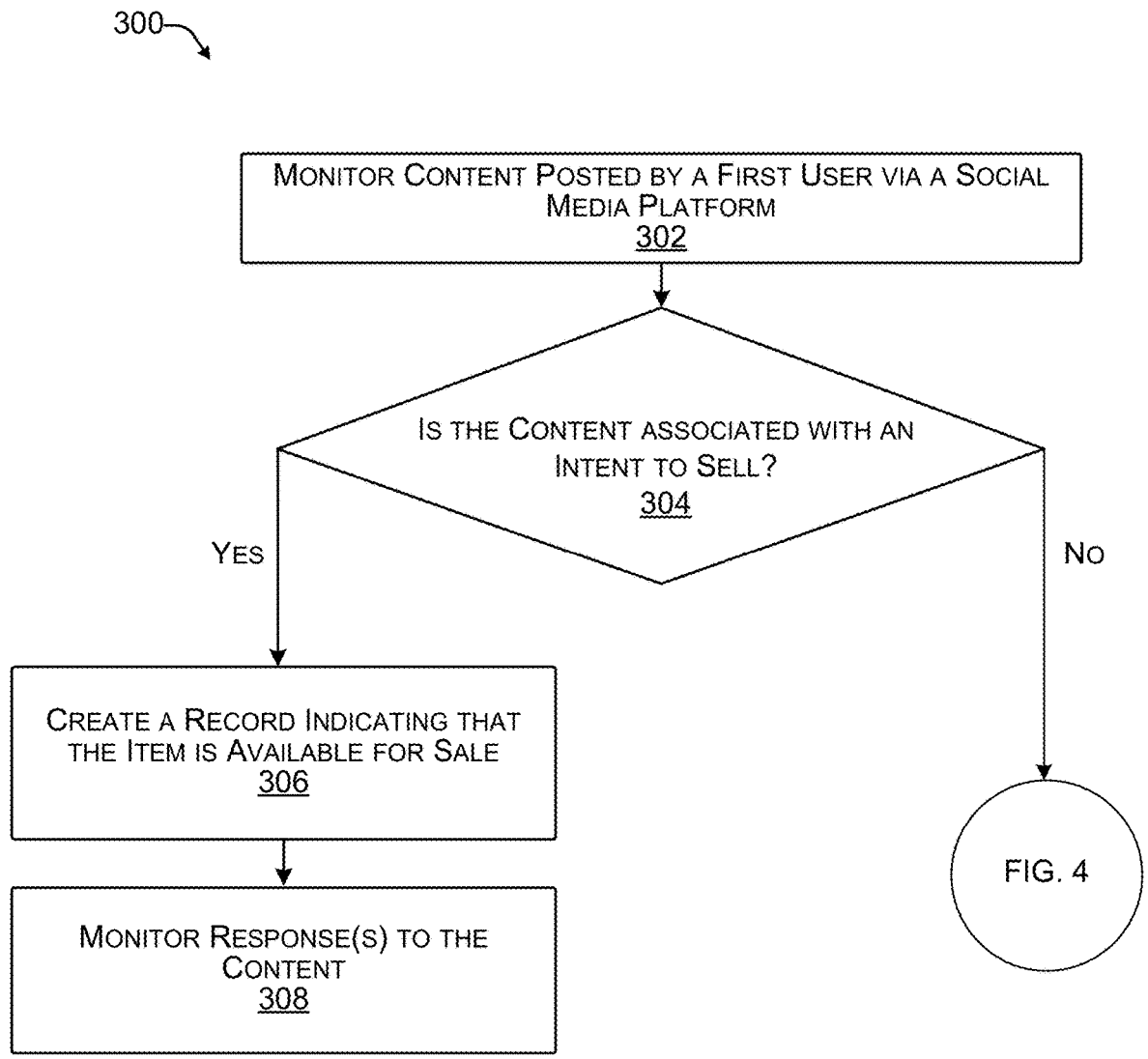
FIG. 3 illustrates an example process for monitoring content posted by users of a social media platform (availed via a social media service provider) for creating selling opportunities.

FIG. 3 illustrates an example process 300 for monitoring content posted by users of a social media platform (availed via a social media service provider) for creating selling opportunities.

Block 302 illustrates monitoring content posted by a first user via a social media platform. In at least one example, users of a social media platform can create and/or present content via the social media platform. For instance, the seller 110 can interact with a user interface of the user interface(s) 122 that is availed via the social media platform to post content to the social media platform. As described above, a first user "posts" content to a social media platform when the first user publishes the content for other users to consume. In at least one example, the content management module 114 can monitor content posted by the first user (and multiple other users) via the social media platform. In some examples, the content management module 114 can utilize an automated program that runs over the network(s) 108 (e.g., a "bot," a web crawler, etc.) to monitor content posed by users of the social media platform. In additional or alternative examples, the content management module 114 can use natural language processing, image recognition, and/or other machine-trained mechanisms to monitor content posed by users of the social media platform.

Block 304 illustrates determining whether the content is associated with an intent to sell. In at least one example, the content management module 114 can analyze content to determine whether the content itself is associated with an intent to sell or whether information associated with the content indicates an intent to sell. In at least one example, a seller can post content with a sell option (e.g., an actionable link to purchase item(s) via an interaction with the content), which can indicate that such item(s) are for sale. Posting such content can be an explicit indication that a seller desires to sell an item. However, if a seller does not include a sell option with content when such content is posted, the content management module 114 can analyze the content to determine whether the content is associated with an intent to sell, which can be an implicit indicator that the seller desires to sell the item(s) depicted in the content. That is, content can be associated with an intent to sell if the content includes explicit indicators that the seller desires to sell item(s) depicted in the content, but there is not a sell option associated with the content. For instance, content can be a video where a first user indicates that he or she is selling tickets to an event, but without providing an option to complete the purchase. In such an example, the content management module 114 can determine that the content is associated with an intent to sell. In an additional or alternative example, a first user can post an image that is accompanied by text indicating that the first user is selling item(s) in the image. In some examples, neither the content, nor information associated therewith, indicates any intention to sell.

In some examples, the content management module 114 can utilize machine-trained mechanism(s) to determine whether content is associated with an intent to sell. For instance, in such examples, the content management module 114 can determine whether other users of the payment processing service provider, which can be similar to the first user (or not), are selling item(s) depicted in the content. If other users are selling such item(s), the content management module 114 can determine that the first user is also intending to sell such item(s). Moreover, the content management module 114 can utilize seasonality as a signal in determining whether content is associated with an intent to sell. For example, if content depicts an item at an end of a season for using an item, the content management module 114 can determine that the content is associated with an intent to sell. Furthermore, in some examples, the content management module 114 can utilize the number of items depicted in content to determine whether the content is associated with an intent to sell. In at least one example, the content management module 114 can utilize signals as described above, in addition to results of natural language processing, image recognition, etc., to determine a score or other metric indicative of whether content is associated with an intent to sell. In such an example, if the score or other metric meets or exceeds a threshold, the content management module 114 can determine that the content is associated with an intent to sell. However, if the score or other metric does not meet or exceed the threshold, the content management module 114 can determine that the content is not associated with an intent to sell.

If the content is associated with an intent to sell, the content management module 114 can create a record indicating that the item is available for sale, as illustrated in block 306. In at least one example, the record can be created at or near the same time that the content is posed to the social media platform. In at least one example, such a record can be used to generate a dedicated webpage and/or link to facilitate a transaction and/or can be used to convert the original post into a post that includes buyable links. In some examples, the content management module 114 can prompt the seller 110 to confirm that the seller 110 desires to sell the item and/or consents to the creation of the record before creating the record.

In some examples, the content management module 114 can auto-populate at least a portion of information at the time the record is created. For example, the content management module 114 can auto-populate information associated with characteristics of the item (e.g., size, color, condition, brand, etc.), which, in some examples, can be based on an image search and/or searches of marketplace(s) where other seller(s), which can be similar to the first user (or not), are selling the item. In some examples, such information can be generated using machine-trained mechanisms, for example, based at least in part on selling activities of the seller 110 and/or other sellers similar to the seller 110. In at least one example, the content management module 114 can prompt the first user for information at the time the record is created. For instance, the content management module 114 can request information associated with characteristics of the item (e.g., size, color, condition, brand, etc.). Furthermore, the content management module 114 can ask the first user whether the first user is looking to sell the item for a particular price (e.g., a minimum price, a fixed price, etc.) or wants to start an auction (e.g., allow users to place bids). In some examples, the content management module 114 can prompt the first user for a period of time for selling the item (e.g., after which the item is no longer to be listed for sale). The content management module 114 can update the record based at least in part on information provided by the first user. That is, the record becomes an inventory record for the item.

Based at least in part on creating the record, the content management module 114 can monitor response(s) to the content, as illustrated in block 308. After the record is created, which can be at the same time the content is posted or shortly thereafter, the content management module 114 can monitor responses to the posted content. As described above, other users can respond to the post, for instance via comment, interaction with a button or other actuation mechanism (e.g., like, dislike, funny, love, etc.), and so on. Interested users can provide indicators indicating their desire to purchase item(s) depicted in the content. In some examples, the indicator can be prescribed (e.g., comment "mine" to indicate a desire to purchase the item). In other examples, the indicator need not be prescribed, and intent can be inferred using natural language processing, image recognition, and/or other machine-trained mechanisms.

In at least one example, the content management module 114 can analyze responses utilizing an automated program that runs over the network(s) 108 (e.g., a "bot," a web crawler, etc.) to determine whether responses indicate an intent to purchase item(s) depicted in the content. In additional or alternative examples, the content management module 114 can analyze the responses using natural language processing, image recognition, and/or other machine-trained mechanisms to determine whether any of the responses are associated with an indicator indicating that another user desires to purchase the item.

If the content is not associated with an intent to sell, process 300 can continue as described in FIG. 4, below.

Figure 4:
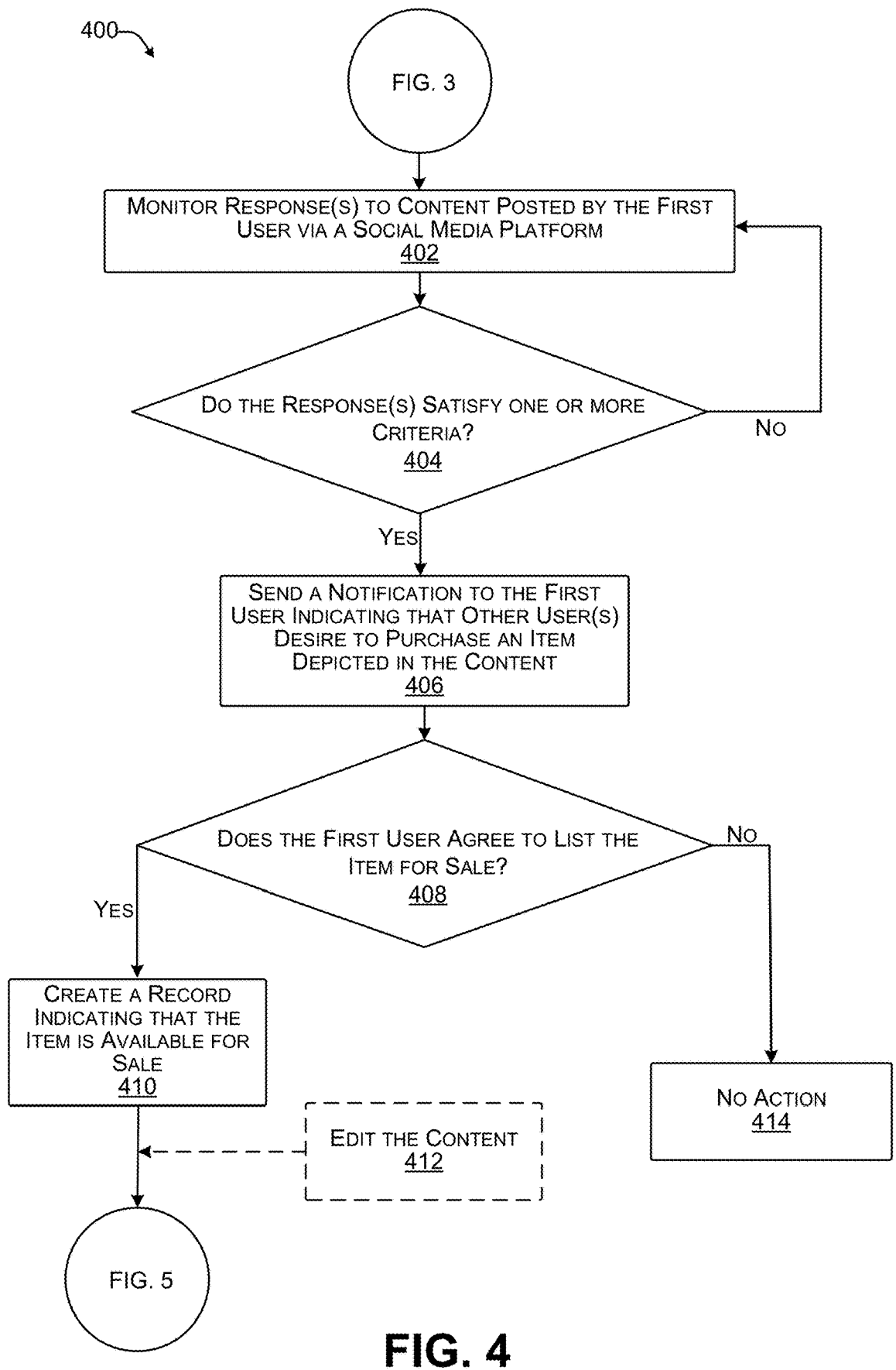
FIG. 4 illustrates an example process for monitoring content posted by users of a social media platform (availed via a social media service provider) for creating selling opportunities.

FIG. 4 illustrates an example process 400 for monitoring content posted by users of a social media platform (availed via a social media service provider) for creating selling opportunities.

Block 402 illustrates monitoring response(s) to content posted by a first user via a social media platform. As described above, in at least one example, the content management module 114 can monitor responses to content posted via the social media platform using an automated program that runs over the network(s) 108 (e.g., a "bot," a web crawler, etc.) and/or natural language processing, image recognition, and/or other machine-trained mechanisms to determine whether such responses indicate intent to purchase item(s) depicted in the content. In some examples, users can respond to content (e.g., via comment, an action associated with a button or other actuation mechanism, etc.) using an indicator indicating that users desire to purchase item(s) in the content. In some examples, content can depict multiple items. In such examples, the content management module 114 can utilize natural language processing, image recognition, and/or other machine-trained mechanisms to determine which item(s) are of interest to responding users.

Block 404 illustrates determining whether the response(s) satisfy one or more criteria. In at least one example, the content management module 114 can determine whether the response(s) satisfy one or more criteria. In at least one example, a criterion can require that a response include an intent to purchase an item in the content (e.g., a response includes an indicator indicating a desire of a first user to purchase an item in the content). In additional or alternative examples, a criterion can require that a number of responses indicating a desire to purchase an item meet or exceed a threshold. Moreover, in at least one example, a criterion can require that at least one response offers a price that meets or exceeds a threshold. In some examples, the one or more criteria can be set by the payment processing service provider. In additional or alternative examples, the one or more criteria can be set by the posting user (e.g., the seller) or by other similar posting users.

If the response(s) do not satisfy the one or more criteria, process 400 can return to block 402 to continue monitoring response(s) to content posted by the first user (and other users) of the social media platform.

Block 406 illustrates sending a notification to the first user indicating that other user(s) desire to purchase an item depicted in the content. In at least one example, based at least in part on the response(s) satisfying one or more criteria, the content management module 114 can send a notification to the first user to indicate to the first user that other users are interested in purchasing item(s) in content posted by the first user. For instance, the content management module 114 can send an email, text message, direct message, etc. to the posting user (e.g., the seller). In some examples, such a notification can include the number of interested users, price(s) offered, or other information indicative of the extent that other user(s) are interested in purchasing the item. In some examples, the notification can include additional or alternative information, such as a price differential (e.g., between what an item sold for brand new and what an item is currently selling for on one or more marketplaces), price patterns, price predictions, current availability of an item, availability patterns, availability predictions, etc. Such a notification can be used to incentivize the first user to list the item for sale. In some examples, the notification can include a button or other actuation mechanism that enables the first user to agree to list the item for sale and a button or other actuation mechanism that enables the first user to indicate that he or she does not desire to list the item for sale. In some examples, the notification can be time sensitive such that after a lapse of a predetermined period of time, the failure of the first user to respond can indicate that the first user does not desire to list the item for sale.

Block 408 illustrates determining whether the first user agrees to list the item for sale. The content management module 114 can analyze a response from the first user (e.g., a device associated therewith) to determine whether the first user agrees to list the item for sale. Based at least in part on the first user indicating a desire to list the item(s) for sale, the content management module 114 can create a record for the item, as illustrated in block 410. That is, in at least one example, a record can be created at some time after the content is posted and response(s) to the content are such that they satisfy one or more criteria. The record can be stored in the data store(s) 120 and can be used to facilitate a transaction for the item, as described above. In some examples, the content management module 114 can prompt the seller 110 to confirm that the seller 110 desires to sell the item and/or consents to the creation of the record before creating the record. As described above, in at least one example, such a record can be used to generate a dedicated webpage and/or link to facilitate a transaction and/or can be used to convert the original post into a post that includes buyable links.

In some examples, the content management module 114 can auto-populate at least a portion of information at the time the record is created. For example, the content management module 114 can auto-populate information associated with characteristics of the item (e.g., size, color, condition, brand, etc.), which, in some examples, can be based on an image search and/or searches of marketplace(s) where other seller(s), which can be similar to the first user (or not), are selling the item. In some examples, such information can be generated using machine-trained mechanisms, for example, based at least in part on selling activities of the seller 110 and/or other sellers similar to the seller 110. In at least one example, the content management module 114 can prompt the first user for information at the time the record is created. For instance, the content management module 114 can request information associated with characteristics of the item (e.g., size, color, condition, brand, etc.). Furthermore, the content management module 114 can ask the first user whether the first user is looking to sell the item for a particular price (e.g., a minimum price, a fixed price, etc.) or wants to start an auction (e.g., allow users to place bids). In some examples, the content management module 114 can prompt the first user for a period of time for selling the item (e.g., after which the item is no longer to be listed for sale). The content management module 114 can update the record based at least in part on information provided by the first user. That is, the record becomes an inventory record for the item. In at least one example, process 400 can proceed via process 500, described below with reference to FIG. 5.

Block 412, which can be optional, illustrates editing the content. In some examples, the content management module 114 can edit the content to provide additional information associated with the item (e.g., based at least in part on information provided by the first user and/or auto-populated, as described above). In at least one example, the content management module 114 can edit the content to provide an instruction regarding a particular indicator to use to purchase the item (e.g., a particular word, image, emoji, etc.), a cost of the item, a length of time the item will be available for sale, and the like. As described above, in additional or alternative examples, the content management module 114 can add a response to the content that includes such instructions. Furthermore, in some examples, the content management module 114 can convert the original post into a post that includes buyable links based at least in part on the record and/or information associated therewith.

If the first user does not agree to list the item for sale, the content management module 114 can refrain from taking any action, as illustrated in block 414.

Figure 5:
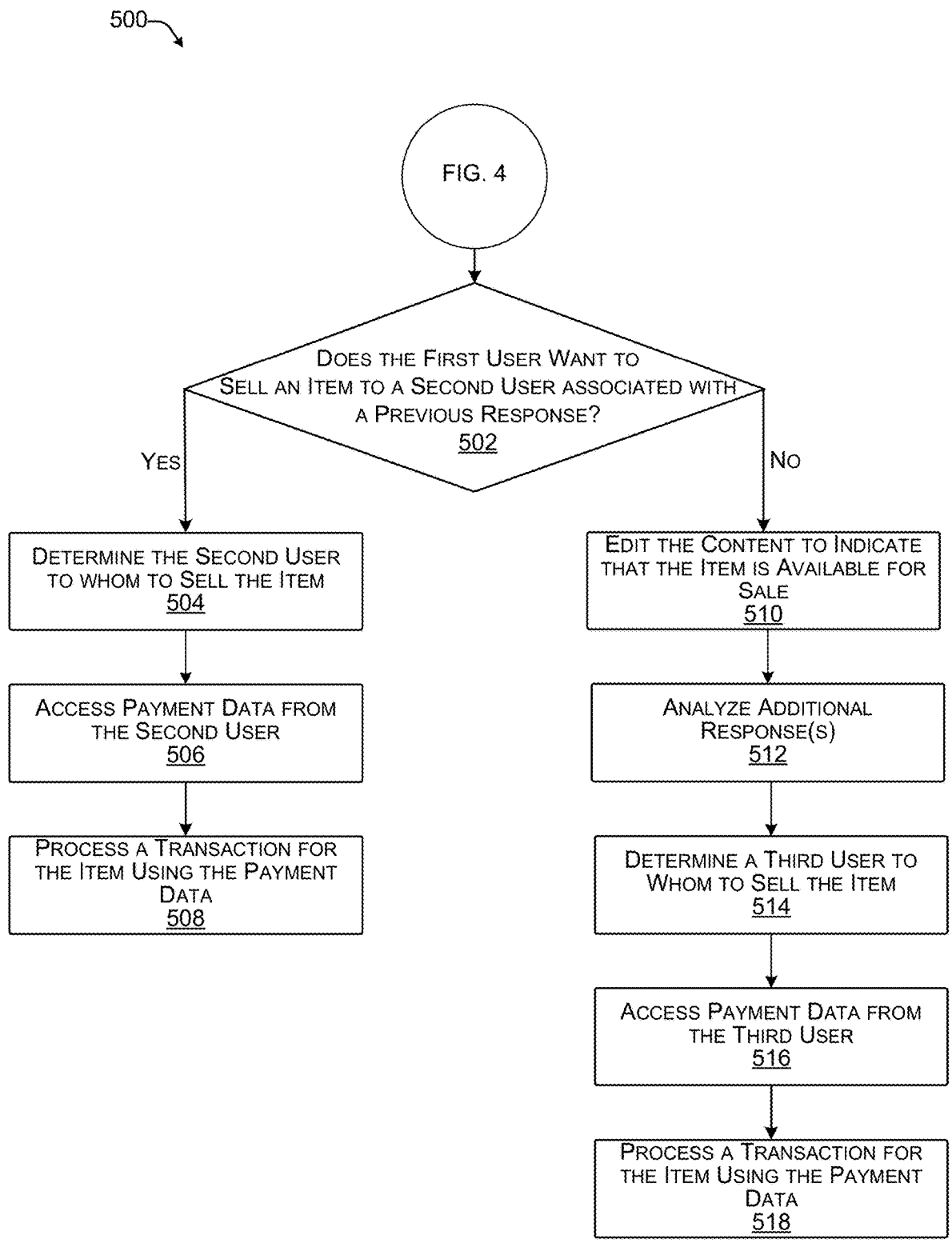
FIG. 5 illustrates an example process for facilitating a transaction responsive to a user opting to list an item for sale via a social media platform (offered by a social media service provider).

FIG. 5 illustrates an example process 500 for facilitating a transaction responsive to a first user opting to list an item for sale via a social media platform (offered by a social media service provider).

Block 502 illustrates determining whether the first user wants to sell an item to a second user associated with a previous response. Responsive to opting to list an item for sale (based on interest determined from responses to content depicting the item), a first user can determine whether he or she intends to sell the item to another user who has already responded to their post, or to another user. That is, in some examples, the first user can opt to sell an item to another user that has already responded to the post of the content. For example, the first (in time) user to respond may receive the first offer to purchase the item and/or another user who has offered a highest price may receive the first offer to purchase the item.

In other examples, the first user can opt to list the item and allow additional users to respond to the listing, for example, via a new response or an updated response. For example, the first user may decide to wait to see if the first user can get a better price for the item after listing the item for sale. Or, the first user may be interested in setting up an auction. In some examples, the first user can interact with a first user interface of the first user interface(s) 122 to indicate whether the first user desires to sell the item to a first user that has already responded or to list the item to solicit one or more additional responses and/or can provide such an indication in association with the response to the notification described above. Example graphical user interfaces (GUIs) for facilitating such are described below.

If the user opts to sell the item to a second user associated with a previous response, the content management module 114 can determine the second user to whom to sell the item, as illustrated in block 504. The content management module 114 can rank, or otherwise establish a priority, among multiple responses based at least in part on one or more criteria. For instance, responses can be ranked based on time, such that a first-in-time response is prioritized over a later-in-time response. Additionally or alternatively, responses can be ranked based on bids (e.g., prices offered to purchase the item) such that a higher-value bid is prioritized over a lower-value bid. Furthermore, responses can be ranked based on credibility of the users associated with such responses. For instance, responses from users that are known to be associated with a robot or fraudulent users can be ranked below responses from users that are validated (e.g., based on prior transaction history). Moreover, the content management module 114 can rank responses from users that are known to respond to posted content but that fail to complete transactions (e.g., more than a threshold amount of time or per some other metric) below responses from users that are known to complete transactions (e.g., conversion rate). Various other criterion can be used to rank responses including but not limited to creditworthiness, whether or not payment data is already on-file, how many items a user has previously purchased and/or intends to purchase, and so on. In at least one example, the content management module 114 can rank responses using a machine-trained mechanism, for example, based at least in part on past and present transactions, or other interactions, as described above.

In at least one example, the content management module 114 can select a highest-ranking response and can determine to offer the item for purchase to a user associated with the highest-ranking response. As described above, in some examples, the highest-ranking response can be the first-in-time response. In additional or alternative examples, the highest-ranking response can be a response associated with the highest bid, sequence in virtual line, past interactions with the seller (e.g., buyers tagged as preferred or verified buyers), etc. In at least one example, a highest-ranking response can be associated with a score that can be a highest-value score or a score that meets or exceeds a threshold. In some examples, the content management module 114 can identify a user associated with the selected response and transmit an indication of a transaction to the payment processing module 116.

Block 506 illustrates accessing payment data from the second user. In at least one example, the second user can store payment data in a user profile in the data store(s) 120. In such an example, the payment processing module 116 can utilize the payment data for processing the transaction. That is, in at least one example, the payment processing module 116 can identify the user (e.g., the second user) associated with a response and can determine whether the user is associated with a user profile in the data store(s) 120. In some examples, the payment processing module 116 can identify the user based on personal information that has been permissibly shared between the social media service provider and the payment processing service provider (e.g., name, email address, phone number, etc.) and/or personal information shared by the user. In a non-limiting example, the second user can tag their response with a hashtag or other metadata tag that uniquely identifies the second user, and the presence of such a tag can be used to identify the second user. If the second user is associated with a user profile in the data store(s) 120, the payment processing module 116 can then initiate a transaction. That is, the payment processing module 116 can access payment data associated with the second user and process the transaction, as illustrated in block 508. As described above, in at least one example, the payment processing module 116 can utilize the record, and information associated therewith, to process the transaction.

In an alternative example, the second user may not have a user profile in the data store(s) 120 and/or payment data associated with a user profile in the data store(s) 120 is missing, incomplete, or otherwise unusable. In such an example, the payment processing module 116 can send a request for payment information to a device operable by the second user. Responsive to the second user providing payment data, the payment processing module 116 can process the transaction, as illustrated in block 508. In examples where additional information is required to process the transaction (e.g., price), the payment processing module 116 can facilitate communications between the user and the second user to obtain the additional information for processing the transaction.

Block 508 illustrates processing a transaction for the item using the payment data. As described above, the payment processing module 116 can process transactions. In at least one example, the payment processing module 116 can send a request for authorization of the payment data to a payment service provider and process the transaction based on a response from the payment service provider. In other examples, the payment processing module 116 can access an account maintained by the payment processing service provider and can use funds associated with the account to process the transaction.

In at least one example, the content management module 114 can reserve the item for the second user for a predetermined period of time after which, if the second user has not purchased the item, the content management module 114 can offer the item to a different user. For instance, if the second user does not purchase the item by the time the period of time lapses, the content management module 114 can select another responding user to whom to offer the item. That is, in examples where payment data and/or other information is necessary to process a transaction, the payment processing module 116 can wait to receive the information for a predetermined period of time and after that predetermined period of time lapses, the payment processing module 116 can notify the content management module 114 that the transaction failed. As such, the content management module 114 can select another user to whom to offer the item. Additional details are described below.

If the first user opts to list the item for sale, thus soliciting additional responses, the content management module 114 can edit the content to indicate that the item is available for sale, as illustrated in block 510. For instance, as described above, in at least one example, the content management module 114 can edit the content to provide an instruction regarding a particular indicator to use to purchase the item (e.g., a particular word, image, emoji, etc.), a cost of the item, a length of time the item will be available for sale, and the like. As described above, in an alternate example, the content management module 114 can add a response to the response(s) indicating that the item is available for sale, which can be associated with such instructions.

Block 512 illustrates monitoring additional response(s). In at least one example, the content management module 114 can monitor additional responses. That is, the content management module 114 can analyze the additional responses (which can include new responses or updated responses) using an automated program that runs over the network(s) 108 (e.g., a "bot," a web crawler, etc.) and/or natural language processing, image recognition, and/or other machine-trained mechanisms to determine whether any of the additional responses are associated with an indicator indicating that another user desires to purchase the item. In some examples, the additional response(s) can include additional, or alternative, bids from the second user.

Block 514 illustrates determining a third user to whom to sell the item. In at least one example, the content management module 114 can determine that a response includes an indicator indicating a desire to purchase the item(s) in the content. In such an example, the content management module 114 can select a response, as described above with reference block 504. Based at least in part on selecting a response, the content management module 114 can identify a user associated with the selected response (e.g., a third user) and transmit an indication of a transaction to the payment processing module 116. The payment processing module 116 can then initiate a transaction. That is, the payment processing module 116 can access payment data from the third user, as illustrated in block 516 and described above with reference to block 506 and process a transaction for the item using the payment data, as illustrated in block 518 and as described above with reference to block 508.

With respect to FIGS. 3-5, the seller can opt, at any time, not to list the item for sale. In such an example, the content can revert to an original posting, if applicable, and the item may no longer be offered for sale. In some examples, the seller can opt to save the item for a sale at a later time. In such an example, the record can be stored and accessed at a later time for a subsequent sale.

Figure 6:
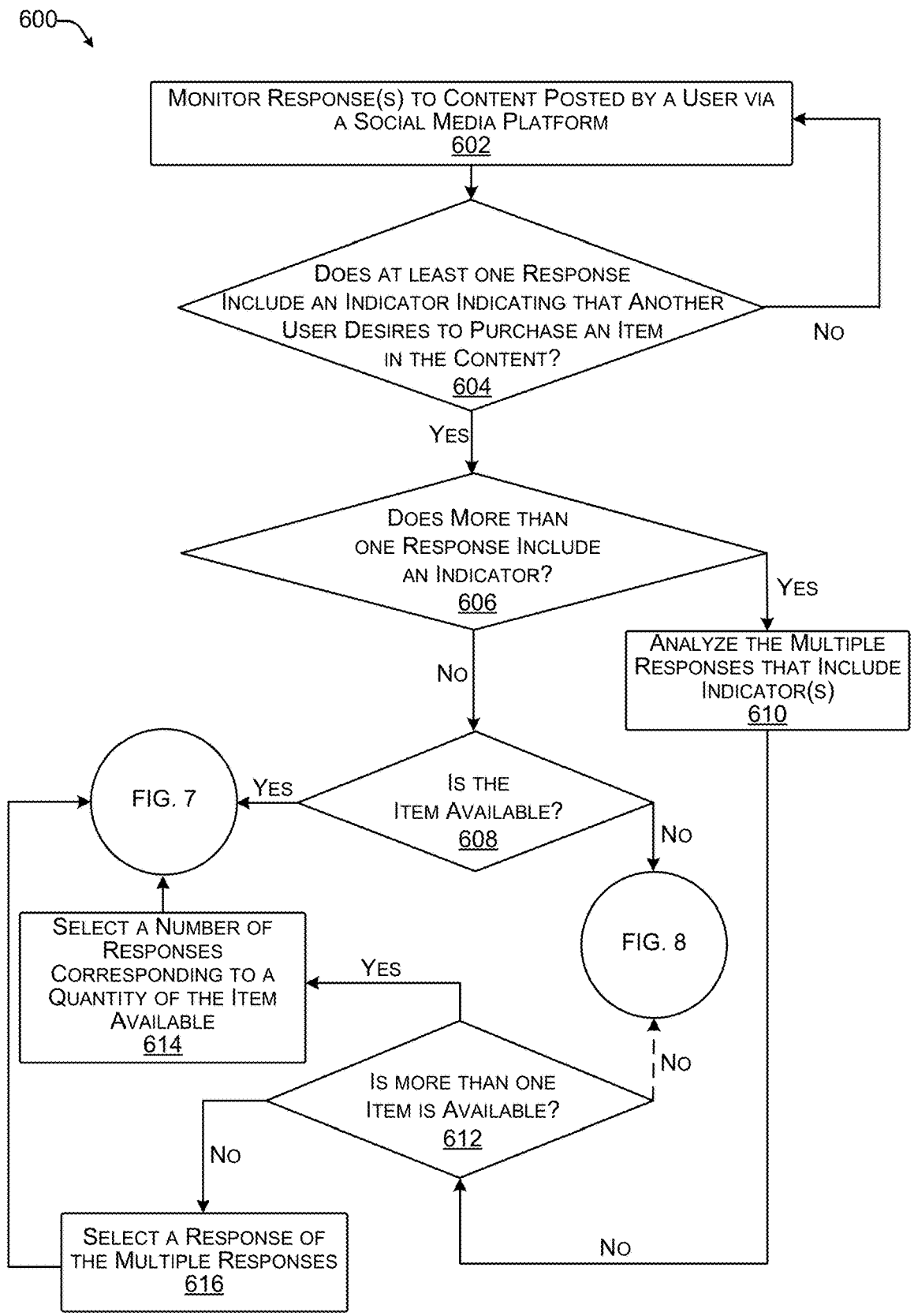
FIG. 6 illustrates an example process for monitoring responses to content posted via a social media platform and/or facilitating transactions based on such responses.

FIG. 6 illustrates an example process 600 for monitoring responses to content posted via a social media platform and/or facilitating transactions based on such responses.

Block 602 illustrates monitoring response(s) to content posted by a user via a social media platform. As described above, in at least one example, the content management module 114 can monitor responses to content posted via the social media platform to determine whether such responses indicate intent to purchase item(s) depicted in the content. In some examples, as described above, users can respond to content (e.g., via comment, an action associated with a button or other actuation mechanism, etc.) using an indicator indicating that users desire to purchase item(s) in the content. At least one example, the indicator can be prescribed (e.g., comment "mine" to indicate a desire to purchase the item) and the content management module 114 can analyze responses to identify the prescribed indicator. In other examples, the content management module 114 can analyze the responses to determine whether any of the responses are associated with another indicator indicating that another user desires to purchase the item. In at least one example, the content management module 114 can use an automated program that runs over the network(s) 108 (e.g., a "bot," a web crawler, etc.) and/or natural language processing, image recognition, and/or other machine-trained mechanisms to determine which item(s) are of interest to responding users.

Block 604 illustrates determining whether at least one response includes an indicator indicating that another user desires to purchase an item in the content. If no response includes an indicator indicating that another user desires to purchase an item in the content, process 600 can return to block 602. However, if a response includes an indicator indicating that at least one other user desires to purchase the item, the content management module 114 can determine whether more than one response includes an indicator indicating that another user desires to purchase an item in the content, as illustrated in block 606. If only a single response includes an indicator indicating that another user desires to purchase the item, the content management module 114 can determine whether the item is available, as illustrated in block 608.

Block 608 illustrates determining whether the item is available. In at least one example, the content management module 114 can access the record associated with the item to determine whether the item is still available for sale (e.g., the seller has not changed his or her mind to sell the item, the seller has not sold the item to another buyer via another channel, etc.). If the item is available, process 600 can continue as described in FIG. 7 below. However, if the item is not available, process 600 can continue as described in FIG. 8 below.

Block 610 illustrates analyzing the multiple responses that include indicator(s) indicating that other users desire to purchase an item in the content. In at least one example, based at least in part on determining that more than one response to content posted via social media includes an indicator indicating that another user desires to purchase an item depicted in the content, the content management module 114 can analyze the individual responses. In at least one example, the content management module 114 can rank, or otherwise establish a priority, among the multiple responses based at least in part on one or more criteria. For instance, responses can be ranked based on time, such that a first-in-time response is prioritized over a later-in-time response. Additionally or alternatively, responses can be ranked based on bids (e.g., prices offered to purchase the item) such that a higher-value bid is prioritized over a lower-value bid. Furthermore, responses can be ranked based on credibility of the users associated with such responses. For instance, responses from users that are known to be associated with a robot or fraudulent users can be ranked below responses from users that are validated (e.g., based on prior transaction history). Moreover, the content management module 114 can rank responses from users that are known to respond to posted content but that fail to complete transactions (e.g., more than a threshold amount of time or per some other metric) below responses from users that are known to complete transactions (e.g., conversion rate). Various other criterion can be used to rank responses including but not limited to creditworthiness, whether or not payment data is already on-file, how many items a user has previously purchased and/or intends to purchase, and so on.

Block 612 illustrates determining if more than one item is available. If more than one item is available, the content management module 114 can select a number of responses corresponding to the quantity of the item available, as illustrated in block 614, and process 600 can continue as described in FIG. 7 below. However, if a single item is available, the content management module can select a highest-ranking response, as illustrated in block 616, and process 600 can continue as described in FIG. 7 below. As described above, in some examples, the highest-ranking response can be the first-in-time response. In additional or alternative examples, the highest-ranking response can be a response associated with the highest bid, etc.

In some examples, if only a single item is available and/or if fewer items are available than the total number of responses including indicator(s) indicating a desire to purchase the item, process 600 can continue as described in FIG. 8 below. That is, the content management module 114 can leverage the platform of sellers associated with the payment processing service provider to identify additional item(s) (of the same or similar item type) that are available for purchase. Additional details are described below in FIG. 8.

Figure 7:
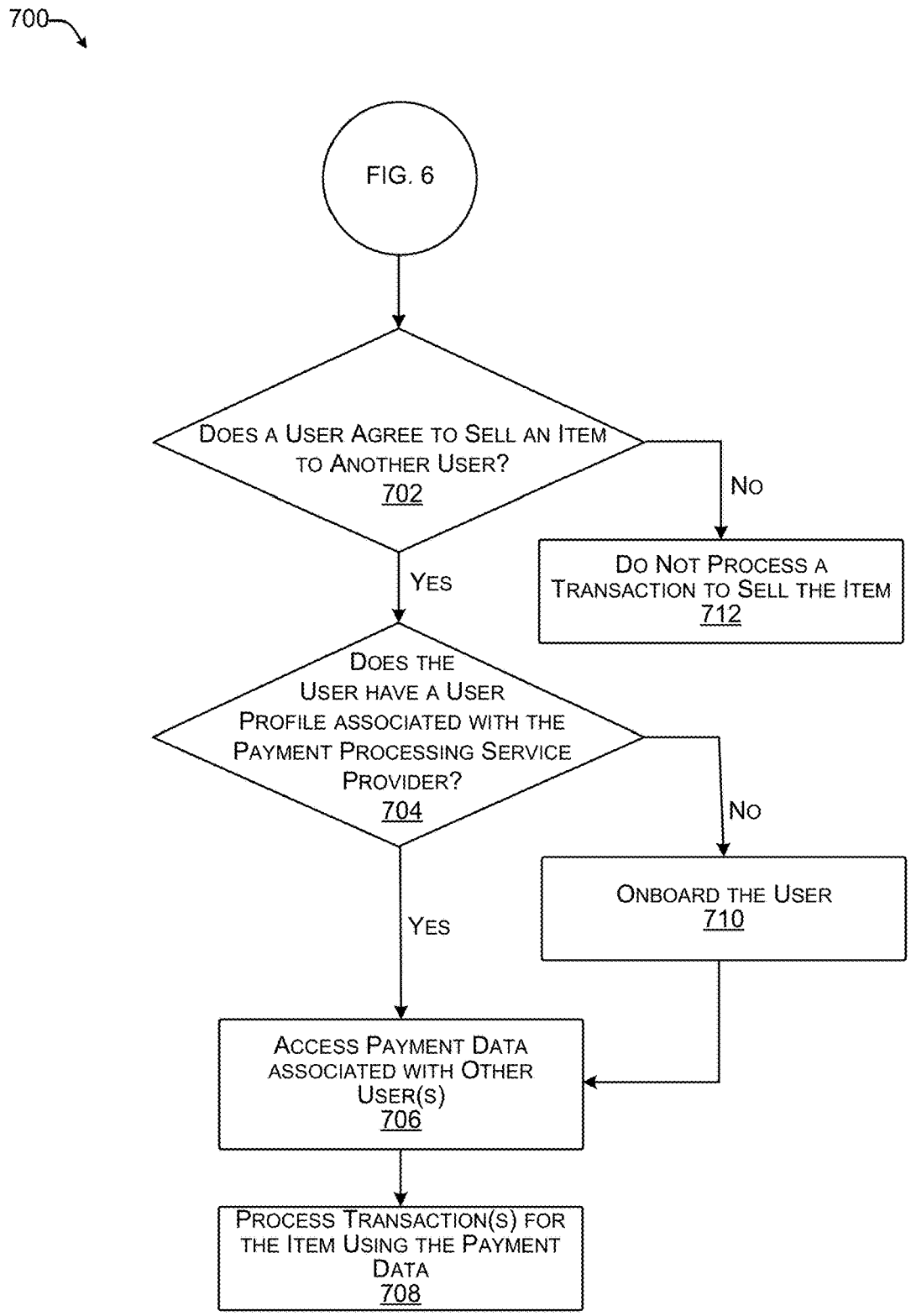
FIG. 7 illustrates an example process for onboarding a user for facilitating a transaction via social media interactions.

FIG. 7 illustrates an example process 700 for onboarding a user for facilitating a transaction via social media interactions.

Block 702 illustrates determining whether a user agrees to sell an item to another user. In at least one example, responsive to one or more responses being selected, the content management module 114 can prompt the user (e.g., the seller) to approve getting into a transactional relationship with another user corresponding to a response of the one or more responses. That is, the content management module 114 can send, to a seller device, such as seller device 106, an indication that a particular user desires to purchase the item and a request for the user (e.g., the seller) to agree to sell the item to the other user. Worth noting, however, in some examples, process 700 can proceed without obtaining approval from the user (e.g., the seller) to sell the item to the other user.

Block 704 illustrates determining whether the user has a user profile associated with the payment processing service provider. In at least one example, the payment processing module 116 can receive an indication of a transaction for an item and an indication that the user agrees to sell the item to the other user. The payment processing module 116 can determine whether the user selling the item has a user profile associated with the payment processing service provider. That is, the payment processing module 116 can access the data store(s) 120 to determine whether the user is associated with an account. In some examples, the user can utilize services offered by the payment processing service provider and, such usage can cause the payment processing module 116 to generate an account for the user.

Block 706 illustrates accessing payment data associated with the other user(s) associated with the response(s). The payment processing module 116 can access payment data from each of the user(s) associated with the response(s) selected to facilitate transaction(s) between the user (e.g., the seller) and the other user(s) (e.g., the buyer(s)). In some examples, another user can have transacted, or otherwise interacted with, seller(s) associated with the payment processing service provider and, such transactions and/or interactions can cause the payment processing module 116 to generate an account for the other user. In at least one example, such a user can store payment data in a user profile in the data store(s) 120 and/or the user profile can be associated with an account maintained by the payment processing service provider (which can be associated with respective payment data). In such an example, the payment processing module 116 can utilize the payment data for processing the transaction. If the other user (e.g., the buyer) is associated with a user profile in the data store(s) 120, the payment processing module 116 can then initiate a transaction. That is, the payment processing module 116 can access payment data associated with the other user and process the transaction, as illustrated in block 708.

In an alternative example, one of the other users may not have a user profile in the data store(s) 120 and/or payment data associated with a user profile in the data store(s) 120 is missing, incomplete, or otherwise unusable. In such an example, the payment processing module 116 can send a request for payment information to a device operable by the other user. Responsive to the other user providing payment data, the payment processing module 116 can process the transaction, as illustrated in block 708.

Block 710 illustrates onboarding the user. If the payment processing module 116 determines that the user does not have an account with the payment processing service provider, the payment processing module 116 may prompt the user to provide information to the payment processing module 116 to at least temporarily onboard the user. In at least one example, the payment processing module 116 can enable the user to perform transactions until a threshold is satisfied (e.g., a number of transactions, a dollar amount, etc.). If the user has not fully onboarded by the time the threshold is satisfied, the payment processing module 116 can request the user to provide additional information before the user can further use the payment processing service provider. In any event, the payment processing module 116 can access payment data from the other user(s) to process the transaction(s). Such information can be used for transferring funds from the other user(s) (e.g., the buyer(s)) to an account of the user (e.g., the seller), which can be maintained by the payment processing service provider or a third-party payment service provider. In examples where the funds are transferred to the third-party payment service provider, the funds can be transferred via the payment processing service provider prior to the funds being transferred to the third-party payment service provider. Furthermore, information provided by the user, either in association with onboarding in block 708 or previously, can be used to facilitate fulfillment and other aspects of the transaction.

Block 712 illustrates refraining from processing a transaction to between the user and the other user for the item. If the user (e.g., the seller) does not agree to sell the item to the other user, the payment processing module 116 can refrain from selling the item to the other user and/or processing a resulting transaction.

Figure 8:
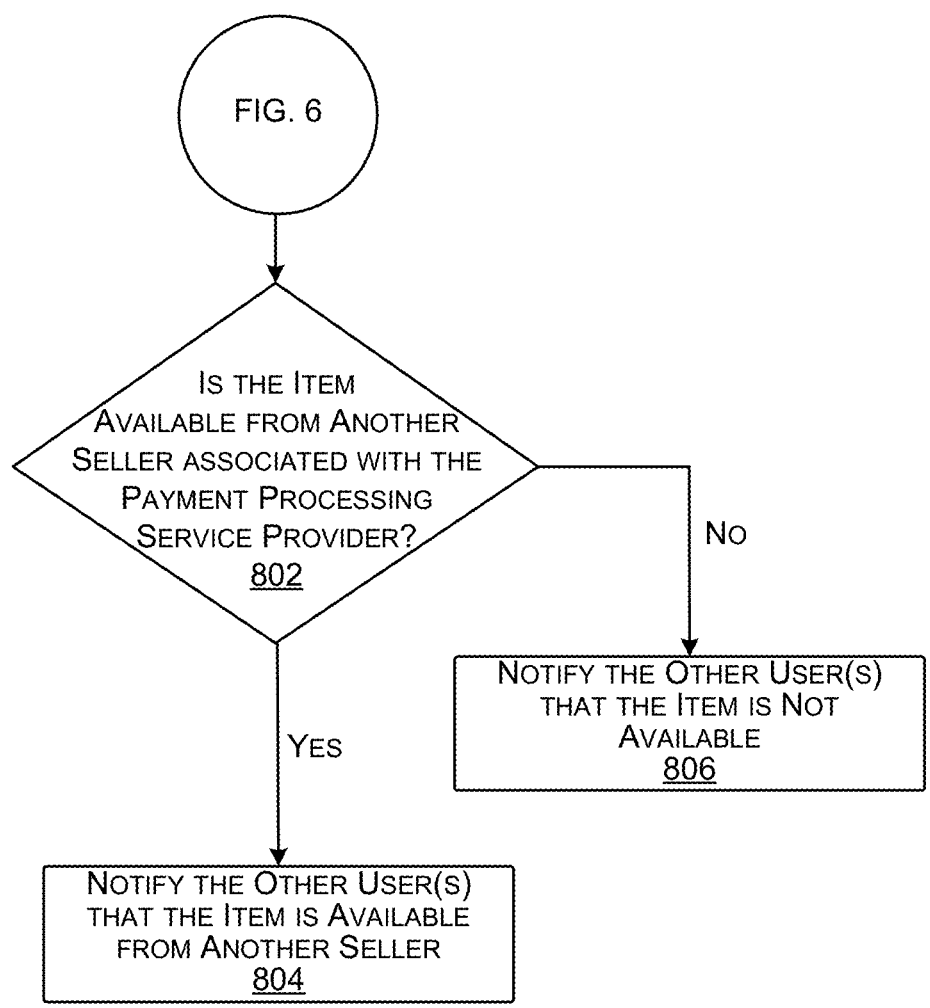
FIG. 8 illustrates an example process for determining the availability of an item leveraging a seller network that is availed via a payment processing service provider.

FIG. 8 illustrates an example process 800 for determining the availability of an item leveraging a seller network that is availed via a payment processing service provider.

Block 802 illustrates determining whether the item is available from another seller associated with the payment processing service provider. In some examples, an item may become unavailable (e.g., the seller changes his or her mind, the seller sells the item to another user via an alternative process, etc.) and/or the demand for the item exceeds the availability of the item. In such examples, the content management module 114 can leverage the payment processing service provider to ascertain whether the item (or items similar to the item) are available via one or more other sellers that are associated with the payment processing service provider. In at least one example, the payment processing service provider can offer services to a plurality of different sellers, as described below with reference to FIG. 14. In some examples, the content management module 114 can access inventory of such sellers and can determine that other seller(s) have the item (or items similar to the item) available for purchase.

Block 804 illustrates notifying the other user(s) that the item is available from another seller. For example, if the content management module 114 identifies another seller from whom the item is available, the content management module 114 can add a response indicating an alternate seller through which the other user(s) (e.g., buyer(s)) can purchase the item. In such an example, the content management module 114 can include a link or other mechanism to enable the other user(s) to purchase the item from the alternate seller. Additionally or alternatively, the content management module 114 can send a notification to the other user(s) to notify the user(s) that there are other sellers who have the item (or a similar item) available for purchase. In such an example, the content management module 114 can include a link or other mechanism to enable the other user(s) to purchase the item from the alternate seller. In some examples, the content management module 114 can add the other user(s) to a queue for another seller, to enable the other user(s) to purchase the item (or a similar item) from the other seller. In at least one example, the content management module 114 can reserve a position in the queue for another user that is a same position, or within a threshold position of, the position of the other user in a queue of the user (e.g., the seller) so that their position is comparable to where it would have been had the other user not tried to purchase the item from the user (e.g., the seller). In at least one example, details associated with the offer and/or transaction can be managed by the content management module 114 such that the bid amount previous offered by the other user is maintained across sellers, thereby mitigating friction and/or lags caused by renegotiating with other seller(s).

Block 806 illustrates notifying the other user(s) that the item is not available. If the content management module 114 is not able to identify another seller from whom the item is available, the content management module 114 can notify the other user(s) that the item is not available. In some examples, the content management module 114 can add a response to the content and/or can send a notification to the other user(s) indicating such.

Figure 9:
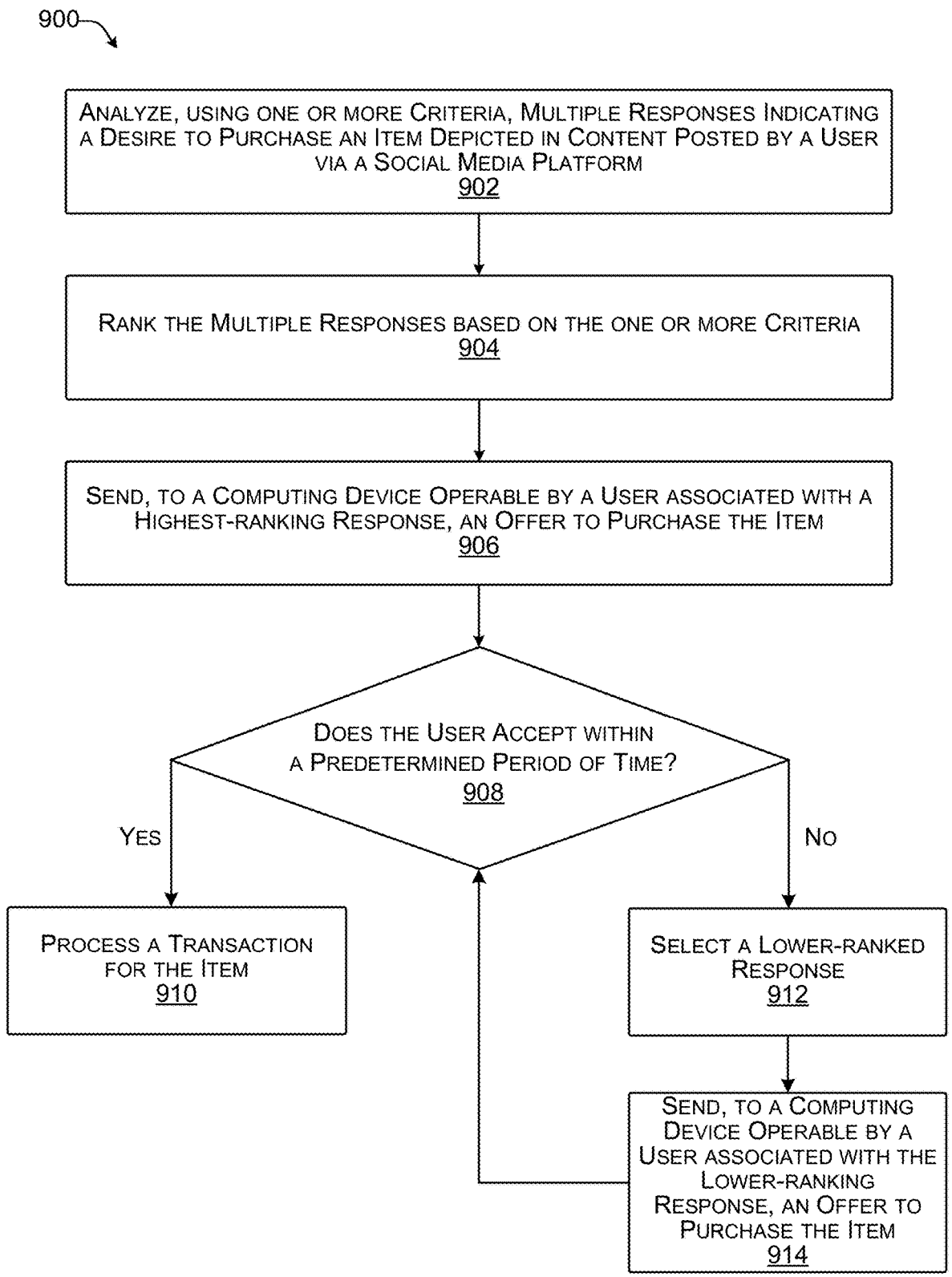
FIG. 9 illustrates an example process for prioritizing multiple responses to content depicting item(s) that are for sale.

FIG. 9 illustrates an example process 900 for prioritizing multiple responses to content depicting item(s) that are for sale.

Block 902 illustrates analyzing multiple responses indicating a desire to purchase an item depicted in content posted by a user via a social media platform using one or more criteria. In examples where there is more than one response indicating a desire to purchase an item depicted in content, the content management module 114 can rank, or otherwise establish a priority, among multiple responses based at least in part on one or more criteria. That is, the content management module 114 can rank the multiple responses based at least in part on the one or more criteria, as illustrated in block 904. For instance, responses can be ranked based on time, such that a first-in-time response is prioritized over a later-in-time response. Additionally or alternatively, responses can be ranked based on bids (e.g., prices offered to purchase the item) such that a higher-value bid is prioritized over a lower-value bid. Furthermore, responses can be ranked based on credibility of the users associated with such responses. For instance, responses from users that are known to be associated with a robot or fraudulent users can be ranked below responses from users that are validated (e.g., based on prior transaction history). Moreover, the content management module 114 can rank responses from users that are known to respond to posted content but that fail to complete transactions (e.g., more than a threshold amount of time or per some other metric) below responses from users that are known to complete transactions (e.g., conversion rate). Various other criterion can be used to rank responses including but not limited to creditworthiness, whether or not payment data is already on-file, how many items a user has previously purchased and/or intends to purchase, and so on. In at least one example, the content management module 114 can rank responses using a machine-trained mechanism, for example, based at least in part on past and present transactions, or other interactions, as described above.

Block 906 illustrates sending, to a computing device operable by a user associated with a highest-ranking response, an offer to purchase the item. In at least one example, the content management module 114 can select a highest-ranking response and can determine to offer the item for purchase to a user associated with the highest-ranking response. As described above, in some examples, the highest-ranking response can be the first-in-time response. In additional or alternative examples, the highest-ranking response can be a response associated with the highest bid, sequence in virtual line, past interactions with the seller (e.g., buyers tagged as preferred or verified buyers), etc. In at least one example, a highest-ranking response can be associated with a score that can be a highest-value score or a score that meets or exceeds a threshold. In some examples, the content management module 114 can identify a user associated with the selected response and transmit an indication of a transaction to the payment processing module 116.

The payment processing module 116 can initiate a transaction for the item. In some examples, the payment processing module 116 can determine whether the user is associated with a user profile in the data store(s) 120 and whether the user profile is associated with either (i) an account maintained by the payment processing service provider that has funds to satisfy at least a portion of the cost of the item or (ii) payment data associated with another instrument (e.g., a debit card, a credit card, etc.). If the payment processing module 116 has access to payment data, the payment processing module 116 can process a transaction for the item. In some examples, the payment processing module 116 can send a notification to the other user (e.g., the buyer) to request the other user confirm the purchase. That is, the payment processing module 116 can send an offer (e.g., conditional, such as a time-restricted, term-restricted, etc.) to purchase the item and, based at least in part on the other user accepting the offer, can process the transaction, e.g., as illustrated at block 910. In such an example, if the other user does not confirm the purchase (e.g., accept the offer) within the predetermined period of time, the payment processing module 116 can determine that the user does not accept the offer within the predetermined period of time.

Furthermore, if the payment processing module 116 does not have access to a user profile in the data store(s) 120 and/or payment data associated with a user profile in the data store(s) 120 is missing, incomplete, or otherwise unusable, the payment processing module 116 can send a request. In such examples, the payment processing module 116 can send a request for payment information a device operable by the other user. Responsive to the other user providing payment data, the payment processing module 116 can process the transaction, as illustrated in block 910. However, if the other user does not provide the payment information within the predetermined period of time, the payment processing module 116 can determine that the user does not accept the offer within the predetermined period of time.

Block 908 illustrates determining whether the user accepts the offer within a predetermined period of time. In at least one example, the server(s) 102 can receive indication of whether the user (e.g., the buyer) accepts the offer, provide payment data, and so on (e.g., from a corresponding device operable by the user). Based at least in part on determining that the user accepts the offer with the predetermined period of time (e.g., confirms the purchase, provides payment information, etc.), the payment processing module 116 can process a transaction for the item, as illustrated in block 910 as described above. Based at least in part on determining that the user does not accept the offer within the predetermined period of time, the content management module 114 can select a lower-ranked response, as illustrated in block 912. The payment processing module 116 can then send, to a computing device operable by a user associated with the lower-ranking response, an offer to purchase the item, as illustrated in block 914. Process 900 can then return to block 908 to determine whether the user accepts the offer within a predetermined period of time, or any other condition identified by the payment processing service provider and/or seller.

That is, as described above, the content management module 114 can reserve the item for the other user for a predetermined period of time after which, if the other user has not purchased the item, the content management module 114 can offer the item to a different user. For instance, if the other user does not purchase the item by the time the period of time lapses, the content management module 114 can select another responding user to whom to offer the item. That is, in examples where payment data and/or other information is necessary to process a transaction, the payment processing module 116 can wait to receive the information for a predetermined period of time and after that predetermined period of time lapses, the payment processing module 116 can notify the content management module 114 that the transaction failed. As such, the content management module 114 can select another user to whom to offer the item.

FIGS. 10-13 illustrate GUIs that can be presented via user interfaces, such as the user interface(s) 122 and the user interface(s) 124 in FIGS. 1 and 2. The GUIs in FIGS. 10-13 are provided for illustrative purposes and should not be construed as limiting. That is, the GUI elements (e.g., text, images, actuation mechanisms, etc.) should not be construed as limiting. Furthermore, the configuration and/or presentation of the GUI elements should not be construed as limiting.

Figure 10:
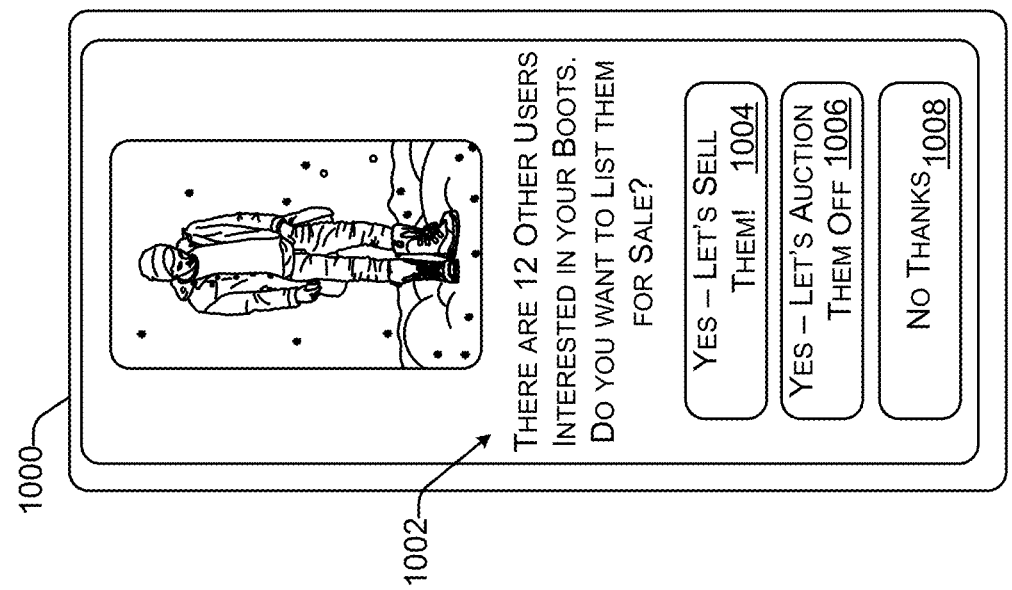
FIG. 10 illustrates an example graphical user interface (GUI) presented for facilitating techniques described herein.

As described above, in at least one example, the content management module 114 can monitor responses to content posted via the social media platform using an automated program that runs over the network(s) 108 (e.g., a "bot," a web crawler, etc.) and/or natural language processing, image recognition, and/or other machine-trained mechanisms to determine whether such responses indicate intent to purchase item(s) depicted in the content. In some examples, the content posted can be associated with an explicit intent to sell an item depicted in the content (e.g., as illustrated in FIG. 1). In other examples, the content posted may not be associated with any intent to sell an item depicted in the content (e.g., as illustrated in FIG. 2) or may be associated with an intent to sell one item depicted in the content but not other item(s) depicted in the content. In some examples, users can respond to content (e.g., via comment, an action associated with a button or other actuation mechanism, etc.) using an indicator indicating that users desire to purchase item(s) in the content. In at least one example, the content management module 114 can send a notification to the user to indicate to the user that other users are interested in purchasing item(s) in content posted by the user. FIG. 10 illustrates an example GUI 1000 for presenting such a notification to a user. In at least one example, the notification can include information 1002 indicating the number of interested users, price(s) offered, or other information indicative of the extent that other user(s) are interested in purchasing the item(s), etc. Such a notification can be used to incentivize the user to list the item for sale. This notification can show up as an interstitial, alert, or "direct" message on the application where the image was first posted, or separately on a communication channel (e.g., text, email) identified by the seller. Furthermore, the notification can dynamically change to track changes in the interested users, bids, ranking of users, and so on. That is, the UI 124 can receive updates to information presented via such a notification and can dynamically update such information as the updates are received (e.g., in near real-time). In at least one example, the user can interact with the GUI 1000 via one or more actuation mechanisms, which can provide a response to the notification to the content management module 114. GUI 1000 includes three actuation mechanisms: 1004, 1006, and 1008.

Actuation mechanism 1004 enables the user to agree to sell the item, but to sell the item to another user who has already offered to buy the item. Actuation mechanism 1006 enables the user to agree to sell the item and to do so via an auction. Actuation mechanism 1008 enables the user to decline the offer to sell the item. Actuation of an actuation mechanism can send a response from the device operable by the user (e.g., the seller device 104) to the server(s) 102. As described above, the content management module 114 can analyze a response from the user (e.g., a device associated therewith, such as the seller device 104) to determine whether the user agrees to list the item for sale. Based at least in part on the user indicating a desire to list the item(s) for sale, the content management module 114 can create a record for the item, as described above.

Figure 11:
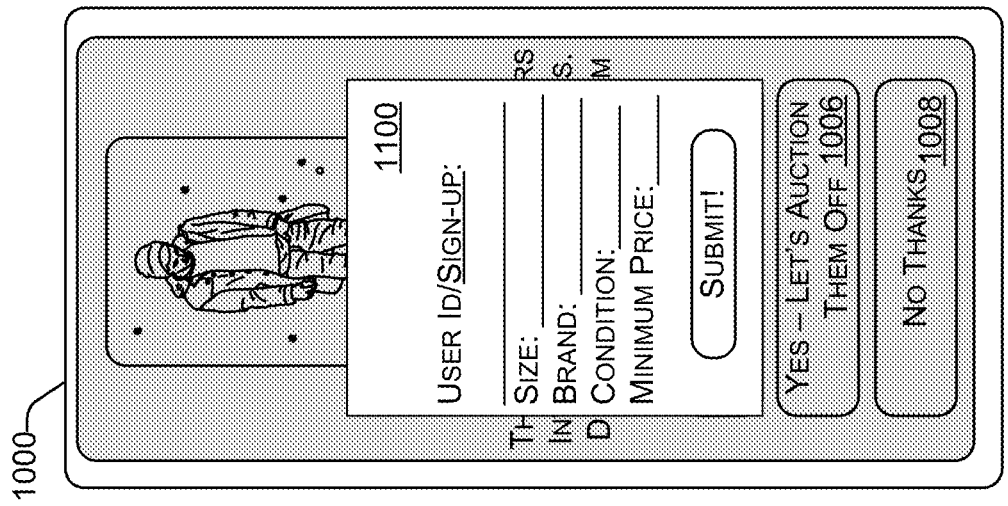
FIG. 11 illustrates another example GUI presented for facilitating techniques described herein.

As described above, the content management module 114 can prompt the user for information at the time the record is created. FIG. 11 illustrates an example GUI 1100 for requesting such information from the user. In some examples, such a prompt can be presented as a pop-up 1100, as illustrated in FIG. 11. In alternative examples, such a prompt can be presented as an overlay or via another linked GUI. In at least one example, the content management module 114 can request information associated with characteristics of the item (e.g., size, color, condition, brand, etc.). Furthermore, the content management module 114 can ask the user whether the user is looking to sell the item for a particular price (e.g., a minimum price, a fixed price, etc.) or wants to start an auction (e.g., allow users to place bids). In some examples, the content management module 114 can prompt the user for a period of time for selling the item (e.g., after which the item is no longer to be listed for sale). The content management module 114 can update the record based at least in part on information provided by the user. That is, the record becomes an inventory record for the item.

In some examples, the prompt can request a user identifier associated with the user (e.g., the seller), which can be used by the content management module 114 to identify the user and determine whether the user is associated with a user profile in the data store(s) 120. If a user does not have a user identifier (e.g., has not onboarded with the payment processing service provider), the user can opt to sign-up with the payment processing service provider.

In at least one example, the same or similar prompt can be presented to a user responsive to the content management module 114 determining that content is associated with an intent to sell when the content is posted. That is, in some examples, the content management module 114 can prompt the user for the same or similar information prior to generating the record, as described above. As described above, in at least one example, at least some of the information can be auto-populated at the time the record is created. For example, the content management module 114 can auto-populate information associated with characteristics of the item (e.g., size, color, condition, brand, etc.), which, in some examples, can be based on an image search and/or searches of marketplace(s) where other seller(s), which may be similar to the user (or not), are selling the item.

As described above, in some examples, a user can post content with an intent to sell an item depicted in the content, but another user identifies another item depicted in the content that they are interested in purchasing. That is, an image may be associated with a direct sell option (e.g., with an actionable link that enables a buyer to purchase item(s) depicted in the image) and/or an indirect sell option (e.g., comment or other indicator that the seller desires to sell item(s) depicted in the image). Nevertheless, another user can identify an item in the image (that is neither associated with the direct sell option nor the indirect sell option) that the other user desires to purchase. As an example, in FIG. 10, a user can post the content with, for example, a direct sell option and/or an indirect sell option for the jacket depicted in the image. Other users, however, can be interested in the boots, in which case, FIGS. 10 and 11 can facilitate the user listing the boots for sale, in addition to, the jacket. In another example, however, the user can post the content without an intent to sell the jacket and/or the boots. In such an example, FIGS. 10 and 11 can facilitate the user listing the boots for sale based at least in part on interest expressed by other users.

Figure 12:
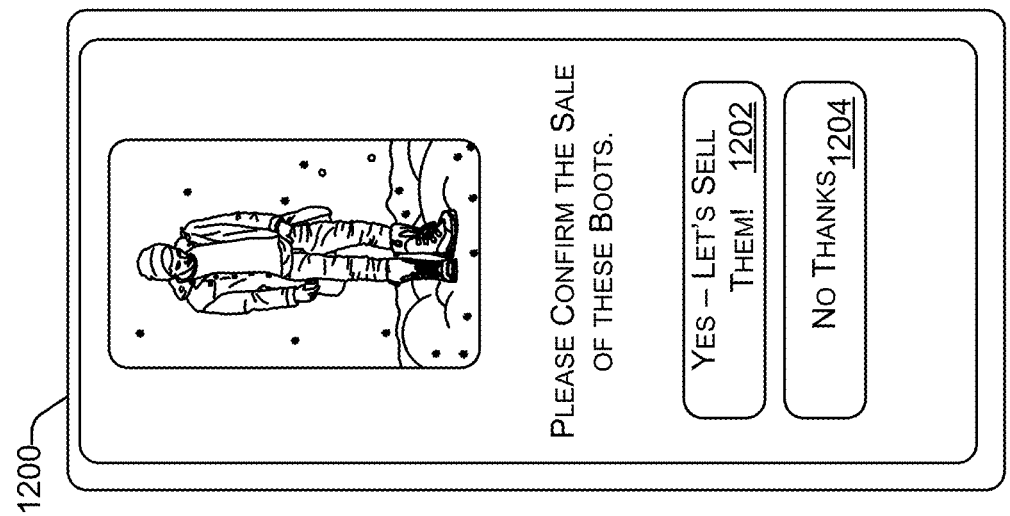
FIG. 12 illustrates another example GUI presented for facilitating techniques described herein.

In some examples, the content management module 114 can send communications to user devices to confirm the sale and/or purchase of an item. FIG. 12 illustrates an example GUI 1200 that can be presented to a seller, requesting the seller confirm that he or she desires to sell his or her item(s) (e.g., boots). The GUI 1200 can include actuation mechanisms, 1202 and 1204, that enable the seller to confirm that he or she desires to sell his or her item(s) (e.g., actuation mechanism 1202) or not (e.g., actuation mechanism 1204). In some examples, a timer can be provided, or otherwise employed, to track time such that if the seller does not confirm the sale prior to a lapse of a predetermined period of time, the content management module 114 can refrain from generating content to enable the seller to sell the item(s).

Figure 13:
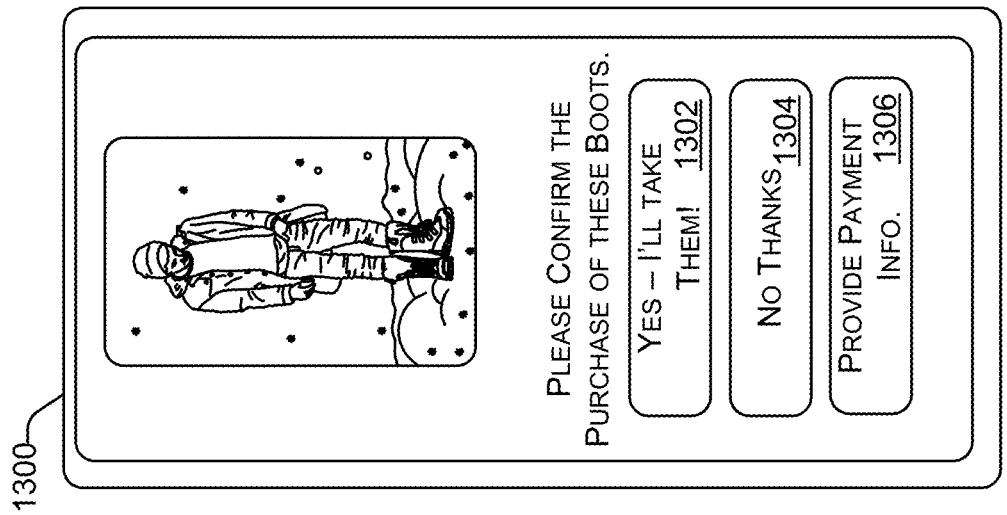
FIG. 13 illustrates another example GUI presented for facilitating techniques described herein.

FIG. 13 illustrates an example GUI 1300 that can be presented to a buyer to confirm that he or she desires to purchase an item (e.g., the boots) and, if payment data is needed, to request payment data. As illustrated in FIG. 13, the GUI 1300 can include actuation mechanisms, 1302 and 1304, that enable the buyer to confirm that he or she desires to purchase the item(s) (e.g., actuation mechanism 1302) or not (e.g., actuation mechanism 1304). Furthermore, the GUI 1300 can include an actuation mechanism 1306 to enable the buyer to provide payment information (e.g., payment data), if necessary. Responsive to the buyer actuating the actuation mechanism 1306, the payment processing module 116 can provide a mechanism for the buyer to securely enter his or her payment data and transmit the payment data to the payment processing service provider. In some examples, a timer can be provided, or otherwise employed, to track time such that if the buyer does not confirm the purchase of the boots prior to a lapse of a predetermined period of time, the content management module 114 can enable another buyer to purchase the item(s).

The GUIs described above with reference to FIGS. 10-13 can be sent via an email, text message, private message, push notification, etc. In some examples, such a communication (e.g., email, text message, private message, push notification, etc.) can include a link or other actuation mechanism that the user can actuate to cause the respective GUI to be presented.

Figure 14:
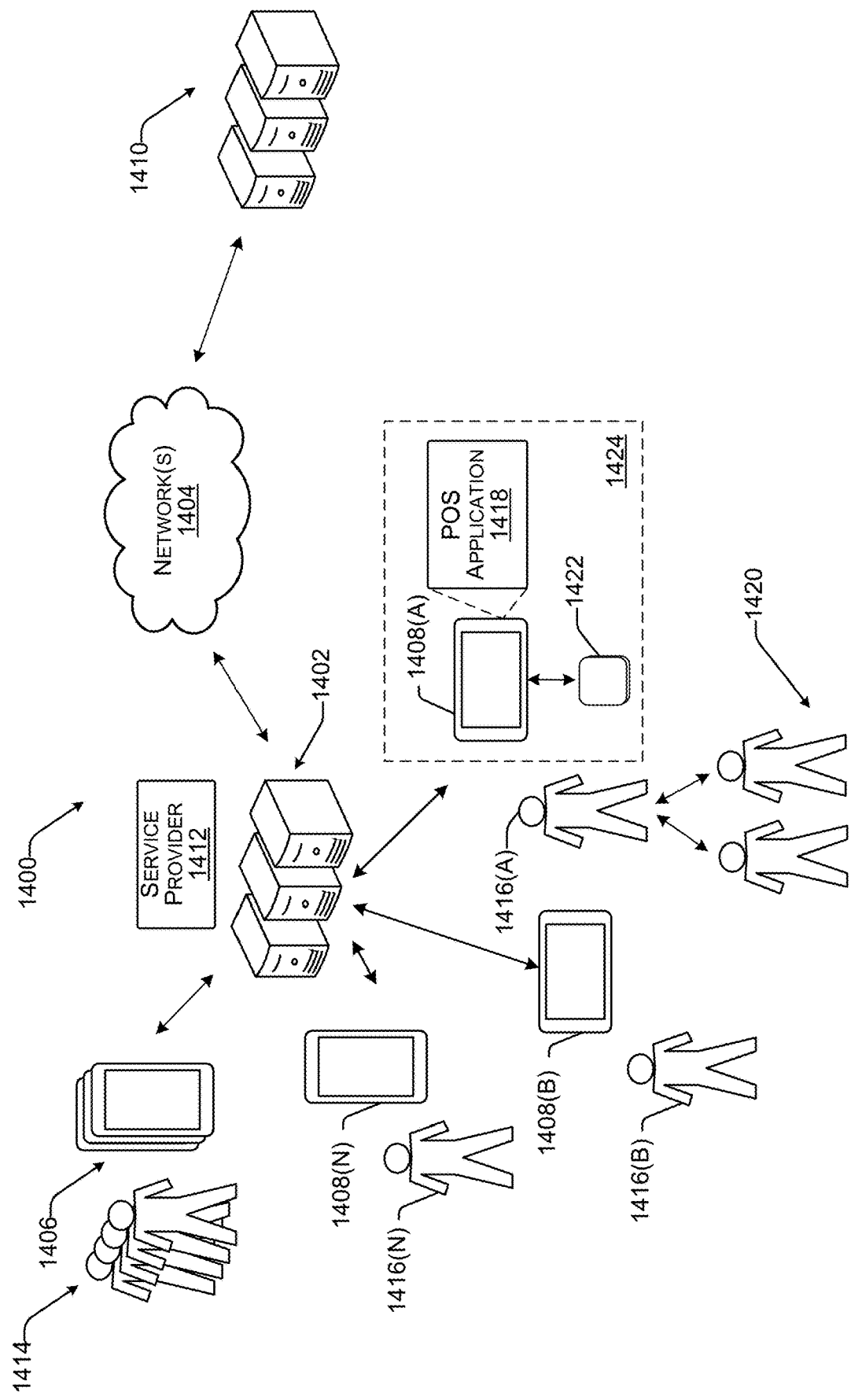
FIG. 14 illustrates an example seller ecosystem for facilitating, among other things, techniques described herein.

FIG. 14 illustrates an example environment 1400. The environment 1400 includes server computing device(s) 1402 that can communicate over a network 1404 with user devices 1406 (which, in some examples can be seller devices 1408 (individually, 1408(A)-1408(N))) and/or server computing device(s) 1410 associated with third-party service provider(s). The server computing device(s) 1402 can be associated with a service provider 1412 that can provide one or more services for the benefit of users 1414, as described below. Actions attributed to the service provider 1412 can be performed by the server computing device(s) 1402.

In at least one example, the service provider 1412 can correspond to the payment processing service provider described above. In at least one example, the server computing device(s) 1402 can correspond to the server(s) 102 and the network(s) 1404 can correspond to the network(s) 108 described above with reference to FIGS. 1 and 2. In at least one example, the social media service providers described above with reference to FIGS. 1 and 2 can be associated with the server computing device(s) 1410 associated with third-party service provider(s).

The environment 1400 can facilitate transacting via social media interactions. As described above, a user (e.g., a seller) can post content via a social media platform. Such content can depict item(s) (e.g., goods and/or services). In some examples, the content can be associated with an intent to sell an item depicted in the content (e.g., text associated with an image indicating that the user is looking to sell an item depicted in the content). In other examples, the content may not be associated with an intent to sell (e.g., no explicit or implicit indication that the user desires to sell anything depicted in the content). Other users can respond to the post, for instance via comment, interaction with a button or other actuation mechanism (e.g., like, dislike, funny, love, etc.), and so on. Interested users can provide indicators indicating their desire to purchase item(s) depicted in the content. For instance, a user can comment "mine" or "I want to buy that [item]." The responses can be analyzed by a payment processing service provider, which can be associated with the service provider 1412. The service provider 1412 can identify an interested user, access payment information for the user, and/or process payment for the item. That is, the service provider 1412 can facilitate a transaction between the buyer and the seller for an item depicted in the content posted via the social media platform.

In at least one example, techniques performed by the environment 1400 can alleviate the need for users interested in selling via social media platforms to perform any action that they usually wouldn't perform prior to posting content to social media platforms. That is, users interested in selling via social media platforms can simply post content to one or more social media platforms and techniques described herein are directed to creating selling opportunities and facilitating transactions based on such content.

As described above, components of the environment 1400 can identify purchasing intent of other users and can create a selling opportunity even when one did not originally exist (e.g., at the time the content was posted). That is, if a user posts content that is not associated with an intent to sell, the service provider 1412 can nevertheless create a record of item(s) associated with the content at some time after the content is posted and can monitor responses to facilitate a transaction.

As described above, users of social media platforms (e.g., websites, applications, and other network-based communication tools provided by social media service providers) leverage social media tools for online commerce ("ecommerce"). However, current technology has limitations, as described above. In some examples, a user interested in purchasing an item posted via social media is required to follow-up with the seller via another communication tool (e.g., email, text message, private message, etc.) to coordinate the purchase. Such systems introduce unnecessary lag due to response times associated with the users. Furthermore, the current infrastructure does not allow automatic filtering of the users and puts the onus on the seller on whether or not to initiate a conversation with the interested users, engage in a financial transaction with them, and so on. In other examples, a user is directed to a webpage (usually different from the webpage or platform where the interaction originated) where the user is then required to add an item to a virtual cart and provide payment data to complete an online transaction. As such, a social media platform has to establish communication interfaces between disparate platforms, for example between a social media platform (that allows interaction between two users) and a payment platform (that facilitates payment transactions). These communication interfaces have to meet security protocols to allow secure communications, such as exchange of financial data. Existing technology also introduces friction when users intend to purchase items via social media platforms. That is, users—both buyers and sellers—are required to perform multiple actions to facilitate a transaction, which can include multiple exchanges of communications, multiple clicks through multiple web pages, interactions or sign-ups with multiple platforms, or the like. As such, current technology is inefficient and is not user friendly. The environment 1400 described herein enables frictionless (or near-frictionless) transactions via interactions with social media content. Thus, techniques described herein offer improvements to existing technology.

In some examples, existing techniques directed to comment selling allow sellers to post images of items available for sale via social media platforms, harvest comments, and turn such comments into invoices. However, in such examples, existing techniques require users to create records for items to be sold via social media posts prior to posting the items via social media platforms. That is, existing techniques require users to provide an image, description of the image, quantity available, sizes (if applicable), etc. Such information is used to create content that can be posted to a social media platform, with an identifier to identify a previously created record. Users can comment when they want to purchase an item and the previously created record can be used to create an invoice and facilitate a transaction. That is, existing techniques require users to perform various actions prior to posting content to a social media platform. For instance, sellers are required to input a significant amount of information prior to posting content to social media platforms. As such, existing techniques require the storage of such content and associated records and introduce unnecessary lag due to time required to input such information and otherwise set up records. The environment 1400 described herein enables improvements to current technology by alleviating required actions prior to posting content via social media platforms. In at least one example, techniques described herein reduce storage requirements by enabling record(s) of item(s) associated with the content to be created at some time after the content is posted (e.g., without the seller(s) having implicitly or explicitly indicated an intent to sell). Furthermore, techniques described herein enable users to use social media platforms consistent with how social media platforms are intended to be used, without requiring additional actions to be performed before content is shared. That is, techniques described herein can alleviate the need for a social media platform to establish communication interfaces between disparate platforms yet can offer the ability for sellers to sell items via a social media platform using secure communications. As such, techniques described herein are directed to improvements over existing technologies.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as buyers, customers, sellers, merchants, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider 1412 or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

In at least one example, the seller device 104 and the buyer device 106 described above in FIGS. 1 and 2 can comprise user devices 1406 as described herein. Similarly, the seller 110 and the buyer 112 can comprise users 1414 as used herein.

In at least one example, the users 1414 can include sellers 1416 (individually, 1416(A)-1416(N)). In an example, the sellers 1416 can operate respective seller devices 1408, which can be user devices 1406 configured for use by sellers 1416. For the purpose of this discussion, a "seller" can be any entity that offers items (e.g., goods or services) for purchase or other means of acquisition (e.g., rent, borrow, barter, etc.). The sellers 1416 can offer items for purchase or other means of acquisition via brick-and-mortar stores, mobile stores (e.g., pop-up shops, food trucks, etc.), online stores, combinations of the foregoing, and so forth. In some examples, at least some of the sellers 1416 can be associated with a same entity but can have different seller locations and/or can have franchise/franchisee relationships. In additional or alternative examples, the sellers 1416 can be different sellers. That is, in at least one example, the seller 1416(A) is a different seller than the seller 1416(B) and/or the seller 1416(C).

For the purpose of this discussion, "different sellers" can refer to two or more unrelated sellers. "Different sellers" therefore can refer to two or more sellers that are different legal entities (e.g., natural persons and/or corporate persons) that do not share accounting, employees, branding, etc. "Different sellers," as used herein, have different names, employer identification numbers (EIN)s, lines of business (in some examples), inventories (or at least portions thereof), and/or the like. Thus, the use of the term "different sellers" does not refer to a seller with various seller locations or franchise/franchisee relationships. Such sellers—with various seller locations or franchise/franchisee relationships—can be referred to as sellers having different seller locations and/or different commerce channels.

Each seller device 1408 can have an instance of a POS application 1418 stored thereon. The POS application 1418 can configure the seller device 1408 as a POS terminal, which enables the seller 1416(A) to interact with one or more buyers 1420. As described above, the users 1414 can include buyers, such as the buyers 1420 shown as interacting with the seller 1416(A). For the purpose of this discussion, a "buyer" can be any entity that acquires items from sellers. While only two buyers 1420 are illustrated in FIG. 14, any number of buyers 1420 can interact with the sellers 1416. Further, while FIG. 14 illustrates the buyers 1420 interacting with the seller 1416(A), the buyers 1420 can interact with any of the sellers 1416.

In at least one example, interactions between the buyers 1420 and the sellers 1416 that involve the exchange of funds (from the buyers 1420) for items (from the sellers 1416) can be referred to as "POS transactions" and/or "transactions." In at least one example, the POS application 1418 can determine transaction data associated with the POS transactions. Transaction data can include payment information, which can be obtained from a reader device 1422 associated with the seller device 1408(A), user authentication data, purchase amount information, point-of-purchase information (e.g., item(s) purchased, date of purchase, time of purchase, etc.), etc. The POS application 1418 can send transaction data to the server computing device(s) 1402. Furthermore, the POS application 1418 can present a UI to enable the seller 1416(A) to interact with the POS application 1418 and/or the service provider 1412 via the POS application 1418.

In at least one example, the seller device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication-based payment instruments, and the like, as described below. In at least one example, the reader device 1422 can plug in to a port in the seller device 1408(A), such as a microphone port, a headphone port, an audio-jack, a data port, or other suitable port. In additional or alternative examples, the reader device 1422 can be coupled to the seller device 1408(A) via another wired or wireless connection, such as via a Bluetooth®, BLE, and so on. Additional details are described below with reference to FIG. 15. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server computing device(s) 1402, which can provide, among other services, a payment processing service. The server computing device(s) 1402 associated with the service provider 1412 can communicate with server computing device(s) 1410, as described below. In this manner, the POS terminal and reader device 1422 may collectively process transaction(s) between the sellers 1416 and buyers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the buyers 1420. In additional or alternative examples, the POS terminal can have a display integrated therein for presenting information to the buyers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a buyer 1420 slides a card, or other payment instrument, having a magnetic strip through a reader device 1422 that captures payment data contained in the magnetic strip. A dip is a card-present transaction where a buyer 1420 inserts a payment instrument having an embedded microchip (i.e., chip) into a reader device 1422 first. The dipped payment instrument remains in the payment reader until the reader device 1422 prompts the buyer 1420 to remove the card, or other payment instrument. While the payment instrument is in the reader device 1422, the microchip can create a one-time code which is sent from the POS system 1424 to the server computing device(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a seller, buyer, etc.), or payment data is required to be recalled from a card-on-file data store, to complete the transaction.

The POS system 1424, the server computing device(s) 1402, and/or the server computing device(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server computing device(s) 1402 over the network(s) 1404. The server computing device(s) 1402 may send the transaction data to the server computing device(s) 1410. As described above, in at least one example, the server computing device(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the server computing device(s) 1410 associated therewith) can send a fund transfer request to a server computing device of a card payment network (e.g., Mastercard®, VISA®, etc.) to determine whether the transaction is authorized or deficient. In at least one example, the service provider 1412 can serve as an acquirer and connect directly with the card payment network.

The card payment network (e.g., the server computing device(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1410 associated therewith) can make a determination as to whether the buyer has the capacity to absorb the relevant charge associated with the payment transaction. In at least one example, the service provider 1412 can serve as an issuer and/or can partner with an issuer. The transaction is either approved or rejected by the issuer and/or the card payment network (e.g., the server computing device(s) 1410 associated therewith), and a payment authorization message is communicated from the issuer to the POS device via a path opposite of that described above, or via an alternate path.

As described above, the server computing device(s) 1410, which can be associated with payment service provider(s), may determine whether the transaction is authorized based on the transaction data, as well as information relating to parties to the transaction (e.g., the buyer 1420 and/or the seller 1416(A)). The server computing device(s) 1410 may send an authorization notification over the network(s) 1404 to the server computing device(s) 1402, which may send the authorization notification to the POS system 1424 over the network(s) 1404 to indicate whether the transaction is authorized. The server computing device(s) 1402 may also transmit additional information such as transaction identifiers to the POS system 1424. In one example, the server computing device(s) 1402 may include a seller application and/or other functional components for communicating with the POS system 1424 and/or the server computing device(s) 1410 to authorize or decline transactions.

Based on the authentication notification that is received by the POS system 1424 from server computing device(s) 1402, the seller 1416(A) may indicate to the buyer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1412 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1414 can access all of the services of the service provider 1412. In other examples, the users 1414 can have gradated access to the services, which can be based on risk tolerance, IDV outputs, subscriptions, and so on. In at least one example, access to such services can be availed to the sellers 1416 via the POS application 1418. In additional or alternative examples, each service can be associated with its own access point (e.g., application, web browser, etc.).

The service provider 1412 can offer payment processing services for processing payments on behalf of the sellers 1416, as described above. For example, the service provider 1412 can provision payment processing software, payment processing hardware and/or payment processing services to sellers 1416, as described above, to enable the sellers 1416 to receive payments from the buyers 1420 when conducting POS transactions with the buyers 1420. For instance, the service provider 1412 can enable the sellers 1416 to receive cash payments, payment card payments, and/or electronic payments from buyers 1420 for POS transactions and the service provider 1412 can process transactions on behalf of the sellers 1416.

As the service provider 1412 processes transactions on behalf of the sellers 1416, the service provider 1412 can maintain accounts or balances for the sellers 1416 in one or more ledgers. For example, the service provider 1412 can analyze transaction data received for a transaction to determine an amount of funds owed to a seller 1416(A) for the transaction. In at least one example, such an amount can be a total purchase price less fees charged by the service provider 1412 for providing the payment processing services. Based on determining the amount of funds owed to the seller 1416(A), the service provider 1412 can deposit funds into an account of the seller 1416(A). The account can have a stored balance, which can be managed by the service provider 1412. The account can be different from a conventional bank account at least because the stored balance is managed by a ledger of the service provider 1412 and the associated funds are accessible via various withdrawal channels including, but not limited to, scheduled deposit, same-day deposit, instant deposit, and a linked payment instrument.

A scheduled deposit can occur when the service provider 1412 transfers funds associated with a stored balance of the seller 1416(A) to a bank account of the seller 1416(A) that is held at a bank or other financial institution (e.g., associated with the server computing device(s) 1410). Scheduled deposits can occur at a prearranged time after a POS transaction is funded, which can be a business day after the POS transaction occurred, or sooner or later. In some examples, the seller 1416(A) can access funds prior to a scheduled deposit. For instance, the seller 1416(A) may have access to same-day deposits (e.g., wherein the service provider 1412 deposits funds from the stored balance to a linked bank account of the seller on a same day as POS transaction, in some examples prior to the POS transaction being funded) or instant deposits (e.g., wherein the service provider 1412 deposits funds from the stored balance to a linked bank account of the seller on demand, such as responsive to a request). Further, in at least one example, the seller 1416(A) can have a payment instrument that is linked to the stored balance that enables the seller to access the funds without first transferring the funds from the account managed by the service provider 1412 to the bank account of the seller 1416(A).

In at least one example, the service provider 1412 may provide inventory management services. That is, the service provider 1412 may provide inventory tracking and reporting. Inventory management services may enable the seller 1416(A) to access and manage a database storing data associated with a quantity of each item that the seller 1416(A) has available (i.e., an inventory). Furthermore, in at least one example, the service provider 1412 can provide catalog management services to enable the seller 1416(A) to maintain a catalog, which can be a database storing data associated with items that the seller 1416(A) has available for acquisition (i.e., catalog management services). In at least one example, the catalog may include a plurality of data items and a data item of the plurality of data items may represent an item that the seller 1461(A) has available for acquisition. The service provider 1412 can offer recommendations related to pricing of the items, placement of items on the catalog, and multi-party fulfilment of the inventory.

In at least one example, the service provider 1412 can provide business banking services, which allow the seller 1416(A) to track deposits (from payment processing and/or other sources of funds) into an account of the seller 1416(A), payroll payments from the account (e.g., payments to employees of the seller 1416(A)), payments to other sellers (e.g., business-to-business) directly from the account or from a linked debit card, withdrawals made via scheduled deposit and/or instant deposit, etc. Furthermore, the business banking services can enable the seller 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the sellers 1416 to visualize their cash flow to track their financial health, set aside money for upcoming obligations (e.g., savings), organize money around goals, etc.

In at least one example, the service provider 1412 can provide financing services and products, such as via business loans, consumer loans, fixed term loans, flexible term loans, and the like. In at least one example, the service provider 1412 can utilize one or more risk signals to determine whether to extend financing offers and/or terms associated with such financing offers.

In at least one example, the service provider 1412 can provide financing services for offering and/or lending a loan to a borrower that is to be used for, in some instances, financing the borrower's short-term operational needs (e.g., a capital loan). For instance, a potential borrower that is a seller can obtain a capital loan via a capital loan product in order to finance various operational costs (e.g., rent, payroll, inventory, etc.). In at least one example, the service provider 1412 can offer different types of capital loan products. For instance, in at least one example, the service provider 1412 can offer a daily repayment loan product, wherein a capital loan is repaid daily, for instance, from a portion of transactions processed by the payment processing service on behalf of the borrower. Additionally and/or alternatively, the service provider 1412 can offer a monthly repayment loan product, wherein a capital loan is repaid monthly, for instance, via a debit from a bank account linked to the payment processing service. The credit risk of the seller may be evaluated using risk models that take into account factors, such as payment volume, credit risk of similarly situated sellers, past transaction history, seasonality, credit history, and so on.

Additionally or alternatively, the service provider 1412 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a seller, which can be one of the sellers 1416. The service provider 1412 can create the loan based at least in part on determining that the borrower purchased or intends to purchase the item from the seller. The loan can be associated with a balance based on an actual purchase price of the item and the borrower can repay the loan over time. In some examples, the borrower can repay the loan via installments, which can be paid via funds managed and/or maintained by the service provider 1412 (e.g., from payments owed to the seller from payments processed on behalf of the seller, funds transferred to the seller, etc.). The service provider 1412 can offer specific financial products, such as payment instruments, tied specifically to the loan products. For example, in one implementation, the server provider 1412 associates capital to a seller or buyer's debit card, where the use of the debit card is defined by the terms of the loan. In some examples, the seller may only use the debit card for making specific purchases. In other examples, the "installment" associated with the loan product is credited directly via the payment instrument. The payment instrument is thus customized to the loan and/or the parties associated with the loan.

The service provider 1412 can provide web-development services, which enable users 1414 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page).

Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the sellers 1416. In at least one example, the service provider 1412 can recommend and/or create content items to supplement omni-channel presences of the sellers 1416. That is, if a seller of the sellers 1416 has a web page, the service provider 1412—via the web-development or other services—can recommend and/or create additional content items to be presented via other channel(s), such as social media, email, etc.

Furthermore, the service provider 1412 can provide payroll services to enable employers to pay employees for work performed on behalf of employers. In at least one example, the service provider 1412 can receive data that includes time worked by an employee (e.g., through imported timecards and/or POS interactions), sales made by the employee, gratuities received by the employee, and so forth. Based on such data, the service provider 1412 can make payroll payments to employee(s) on behalf of an employer via the payroll service. For instance, the service provider 1412 can facilitate the transfer of a total amount to be paid out for the payroll of an employee from the bank of the employer to the bank of the service provider 1412 to be used to make payroll payments. In at least one example, when the funds have been received at the bank of the service provider 1412, the service provider 1412 can pay the employee, such as by check or direct deposit, often a day, a week, or more after when the work was actually performed by the employee. In additional or alternative examples, the service provider 1412 can enable employee(s) to receive payments via same-day or instant deposit based at least in part on risk and/or reliability analyses performed by the service provider 1412.

Moreover, in at least one example, the service provider 1412 can provide employee management services for managing schedules of employees. Further, the service provider 1412 can provide appointment services for enabling users 1414 to set schedules for scheduling appointments and/or users 1414 to schedule appointments.

In some examples, the service provider 1412 can provide restaurant management services to enable users 1414 to make and/or manage reservations, to monitor front-of-house and/or back-of-house operations, and so on. In such examples, the seller device(s) 1408 and/or server computing device(s) 1402 can be configured to communicate with one or more other computing devices, which can be located in the front-of-house (e.g., POS device(s)) and/or back-of-house (e.g., kitchen display system(s) (KDS)). In at least one example, the service provider 1412 can provide order management services and/or fulfillment services to enable restaurants to manage open tickets, split tickets, and so on and/or manage fulfillment services. In some examples, such services can be associated with restaurant sellers, as described above. In additional or alternative examples, such services can be any type of seller.

In at least one example, the service provider 1412 can provide fulfilment services, which can use couriers for delivery, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider 1412. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1412 can receive requests for courier services, automatically assign the requests to active couriers, and communicate dispatch instructions to couriers via user interface (e.g., application, web browser, or other access point) presented via respective devices 1406.

In some examples, the service provider 1412 can provide omni-channel fulfillment services. For instance, if a buyer places an order with a seller and the seller cannot fulfill the order because one or more items are out of stock or otherwise unavailable, the service provider 1412 can leverage other sellers and/or sales channels that are part of the platform of the service provider 1412 to fulfill the buyer's order. That is, another seller can provide the one or more items to fulfill the order of the buyer. Furthermore, in some examples, another sales channel (e.g., online, brick-and-mortar, etc.) can be used to fulfill the order of the buyer.

In some examples, the service provider 1412 can enable conversational commerce via conversational commerce services, which can use one or more machine learning mechanisms to analyze messages exchanged between two or more users 1414, voice inputs into a virtual assistant or the like, to determine intents of user(s) 1414. In some examples, the service provider 1412 can utilize determined intents to automate buyer service, offer promotions, provide recommendations, or otherwise interact with buyers in real-time. In at least one example, the service provider 1412 can integrate products and services, and payment mechanisms into a communication platform (e.g., messaging, etc.) to enable buyers to make purchases, or otherwise transact, without having to call, email, or visit a web page or other channel of a seller. That is, conversational commerce alleviates the need for buyers to toggle back and forth between conversations and web pages to gather information and make purchases.

In at least one example, the service provider 1412 can provide a peer-to-peer payment service that enables peer-to-peer payments between two or more users 1414. In at least one example, the service provider 1412 can communicate with instances of a payment application (or other access point) installed on devices 1406 configured for operation by users 1414. In an example, an instance of the payment application executing on a first device operated by a payor can send a request to the service provider 1412 to transfer an amount of funds (e.g., fiat currency or non-fiat currency such as cryptocurrency, securities, and related assets) from an account of the payor to an account of a payee (e.g., a peer-to-peer payment). The service provider 1412 can facilitate the transfer and can send a notification to an instance of the payment application executing on a second mobile device operated by the payee that the transfer is in process (or has been completed). In some examples, the service provider 1412 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1412 funds the request to payee on behalf of the payor, to speed up the transfer process and compensate for any lags that may be attributed to payor's financial network.

In some implementations, the service provider 1412 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1406.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1412. For instance, the service provider 1412 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1406 (e.g., mobile device or conventional personal computer (PC)) based on instructions transmitted to and from the server computing device(s) 1402 (which, in such an example can be called a "messaging server"). In some instances, the messaging application can include a payment application with messaging capability that enables users of the payment application to communicate with one another. In such instances, the payment application can be executed on the user device 1406 based on instructions transmitted to and from the server computing device(s) 1402 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1412 can create the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1414 may be new to the service provider 1412 such that the user 1414 that has not registered (e.g., subscribed to receive access to one or more services offered by the service provider) with the service provider 1412. The service provider 1412 can offer onboarding services for registering a potential user 1414 with the service provider 1412. In some examples, onboarding can involve presenting various questions, prompts, and the like to a potential user 1414 to obtain information that can be used to create a profile for the potential user 1414. In at least one example, the service provider 1412 can provide limited or short-term access to its services prior to, or during, onboarding (e.g., a user of a peer-to-peer payment service can transfer and/or receive funds prior to being fully onboarded, a seller can process payments prior to being fully onboarded, etc.). In at least one example, responsive to the potential user 1414 providing all necessary information, the potential user 1414 can be onboarded to the service provider 1412. In such an example, any limited or short-term access to services of the service provider 1412 can be transitioned to more permissive (e.g., less limited) or longer-term access to such services.

The service provider 1412 can be associated with IDV services, which can be used by the service provider 1412 for compliance purposes and/or can be offered as a service, for instance to third-party service providers (e.g., associated with the server computing device(s) 1410). That is, the service provider 1412 can offer IDV services to verify the identity of users 1414 seeking to use or using their services. Identity verification requires a buyer (or potential buyer) to provide information that is used by compliance departments to prove that the information is associated with an identity of a real person or entity. In at least one example, the service provider 1412 can perform services for determining whether identifying information provided by a user 1414 accurately identifies the buyer (or potential buyer) (i.e., Is the buyer who they say they are?).

The service provider 1412 is capable of providing additional or alternative services and the services described above are offered as a sampling of services. In at least one example, the service provider 1412 can exchange data with the server computing device(s) 1410 associated with third-party service providers. Such third-party service providers can provide information that enables the service provider 1412 to provide services, such as those described above. In additional or alternative examples, such third-party service providers can access services of the service provider 1412. That is, in some examples, the third-party service providers can be subscribers, or otherwise access, services of the service provider 1412.

Techniques described herein can be configured to operate in both real-time/online and offline modes. "Online" modes refer to modes when devices are capable of communicating with the service provider 1412 (e.g., the server computing device(s) 1402) and/or the server computing device(s) 1410 via the network(s) 1404. In some examples, the seller device(s) 1408 are not capable of connecting with the service provider 1412 (e.g., the server computing device(s) 1402) and/or the server computing device(s) 1410, due to a network connectivity issue, for example. In additional or alternative examples, the server computing device(s) 1402 are not capable of communicating with the server computing device(s) 1410 due to network connectivity issue, for example. In such examples, devices may operate in "offline" mode where at least some payment data is stored (e.g., on the seller device(s) 1408) and/or the server computing device(s) 1402 until connectivity is restored and the payment data can be transmitted to the server computing device(s) 1402 and/or the server computing device(s) 1410 for processing.

In at least one example, the service provider 1412 can be associated with a hub, such as an order hub, an inventory hub, a fulfillment hub and so on, which can enable integration with one or more additional service providers (e.g., associated with the additional server computing device(s) 1410). In some examples, such additional service providers can offer additional or alternative services and the service provider 1412 can provide an interface or other computer-readable instructions to integrate functionality of the service provider 1412 into the one or more additional service providers.

Techniques described herein are directed to services provided via a distributed system of user devices 1406 that are in communication with one or more server computing devices 1402 of the service provider 1412. That is, techniques described herein are directed to a specific implementation—or, a practical application—of utilizing a distributed system of user devices 1406 that are in communication with one or more server computing devices 1402 of the service provider 1412 to perform a variety of services, as described above. The unconventional configuration of the distributed system described herein enables the server computing device(s) 1402 that are remotely-located from end-users (e.g., users 1414) to intelligently offer services based on aggregated data associated with the end-users, such as the users 1414 (e.g., data associated with multiple, different sellers and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct seller accounts, e.g., accounts within the control of the service provider 1412, and those outside of the control of the service provider 1412, to track the business standing (payables, receivables, payroll, invoices, appointments, capital, etc.) of the sellers. The techniques herein provide a consolidated view of a seller's cash flow, predict needs, preemptively offer recommendations or services, such as capital, coupons, etc., and/or enable money movement between disparate accounts (seller's, another seller's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
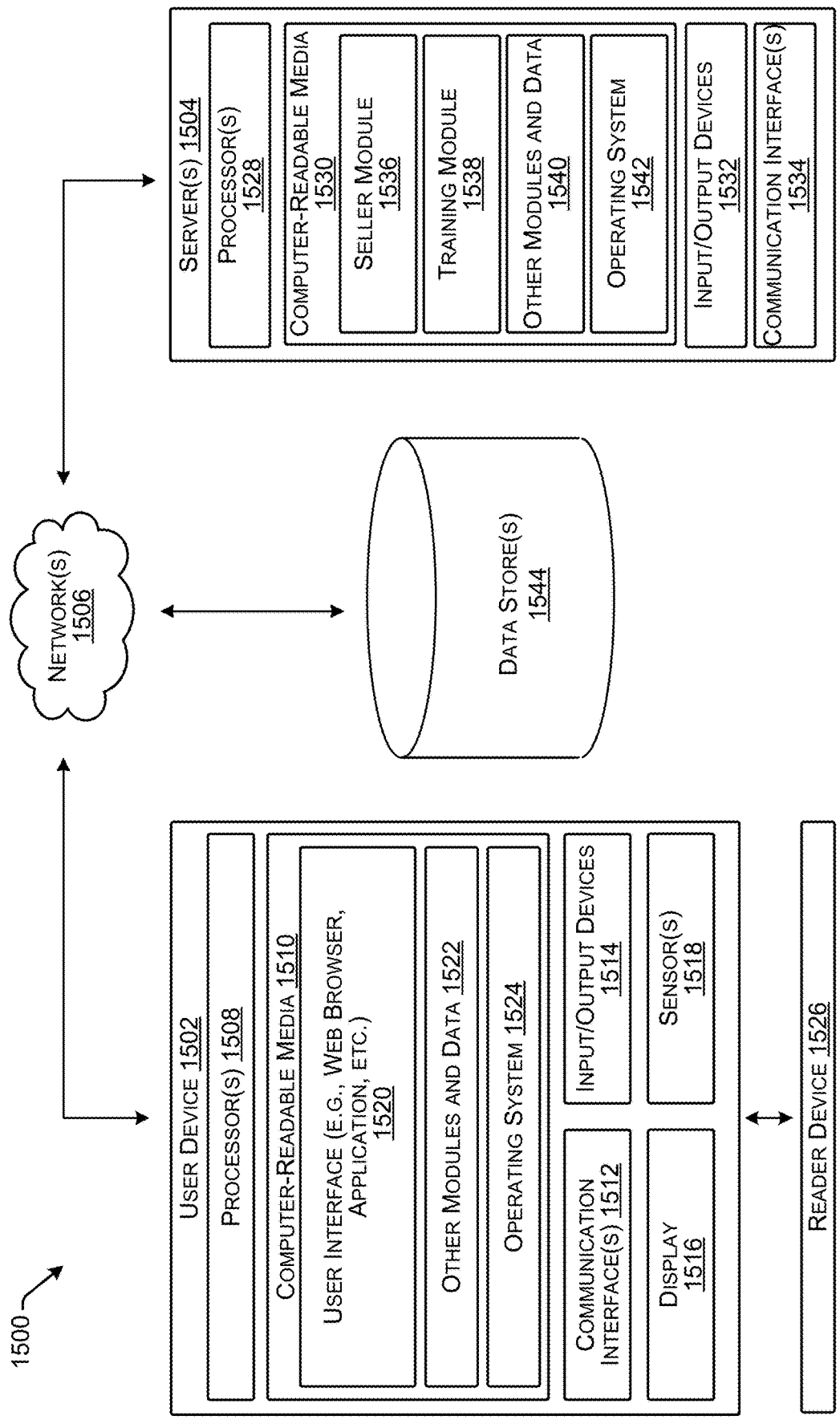
FIG. 15 illustrates additional details associated with individual components of the seller ecosystem described above in FIG. 14.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 14.

Components of the system 1500 can facilitate transacting via social media interactions. As described above, a user (e.g., a seller) can post content via a social media platform. Such content can depict item(s) (e.g., goods and/or services). In some examples, the content can be associated with an intent to sell an item depicted in the content (e.g., text associated with an image indicating that the user is looking to sell an item depicted in the content). In other examples, the content may not be associated with an intent to sell (e.g., no explicit or implicit indication that the user desires to sell anything depicted in the content). Other users can respond to the post, for instance via comment, interaction with a button or other actuation mechanism (e.g., like, dislike, funny, love, etc.), and so on. Interested users can provide indicators indicating their desire to purchase item(s) depicted in the content. For instance, a user can comment "mine" or "I want to buy that [item]." The responses can be analyzed by a payment processing service provider, which can be associated with the service provider 1412 described above with reference to FIG. 14. The payment processing service provider can identify an interested user, access payment information for the user, and/or process payment for the item.

That is, the payment processing service provider can facilitate a transaction between the buyer and the seller for an item depicted in the content posted via the social media platform.

In at least one example, techniques performed by components of the system 1500 can alleviate the need for users interested in selling via social media platforms to perform any action that they usually wouldn't perform prior to posting content to social media platforms. That is, users interested in selling via social media platforms can simply post content to one or more social media platforms and techniques described herein are directed to creating selling opportunities and facilitating transactions based on such content.

As described above, components of the system 1500 can identify purchasing intent of other users and can create a selling opportunity even when one did not originally exist (e.g., at the time the content was posted). That is, if a user posts content that is not associated with an intent to sell, the service provider 1412 can nevertheless create a record of item(s) associated with the content at some time after the content is posted and can monitor responses to facilitate a transaction.

As described above, users of social media platforms (e.g., websites, applications, and other network-based communication tools provided by social media service providers) leverage social media tools for online commerce ("ecommerce"). However, current technology has limitations, as described above. In some examples, a user interested in purchasing an item posted via social media is required to follow-up with the seller via another communication tool (e.g., email, text message, private message, etc.) to coordinate the purchase. Such systems introduce unnecessary lag due to response times associated with the users. Furthermore, the current infrastructure does not allow automatic filtering of the users and puts the onus on the seller on whether or not to initiate a conversation with the interested users, engage in a financial transaction with them, and so on. In other examples, a user is directed to a webpage (usually different from the webpage or platform where the interaction originated) where the user is then required to add an item to a virtual cart and provide payment data to complete an online transaction. As such, a social media platform has to establish communication interfaces between disparate platforms, for example between a social media platform (that allows interaction between two users) and a payment platform (that facilitates payment transactions). These communication interfaces have to meet security protocols to allow secure communications, such as exchange of financial data. Existing technology also introduces friction when users intend to purchase items via social media platforms. That is, users—both buyers and sellers—are required to perform multiple actions to facilitate a transaction, which can include multiple exchanges of communications, multiple clicks through multiple web pages, interactions or sign-ups with multiple platforms, or the like. As such, current technology is inefficient and is not user friendly. Components of the system 1500 described herein enable frictionless (or near-frictionless) transactions via interactions with social media content. Thus, techniques described herein offer improvements to existing technology.

In some examples, existing techniques directed to comment selling allow sellers to post images of items available for sale via social media platforms, harvest comments, and turn such comments into invoices. However, in such examples, existing techniques require users to create records for items to be sold via social media posts prior to posting the items via social media platforms. That is, existing techniques require users to provide an image, description of the image, quantity available, sizes (if applicable), etc. Such information is used to create content that can be posted to a social media platform, with an identifier to identify a previously created record. Users can comment when they want to purchase an item and the previously created record can be used to create an invoice and facilitate a transaction. That is, existing techniques require users to perform various actions prior to posting content to a social media platform. For instance, sellers are required to input a significant amount of information prior to posting content to social media platforms. As such, existing techniques require the storage of such content and associated records and introduce unnecessary lag due to time required to input such information and otherwise set up records. Components of the system 1500 described herein enables improvements to current technology by alleviating required actions prior to posting content via social media platforms. In at least one example, techniques described herein reduce storage requirements by enabling record(s) of item(s) associated with the content to be created at some time after the content is posted (e.g., without the seller(s) having implicitly or explicitly indicated an intent to sell). Furthermore, techniques described herein enable users to use social media platforms consistent with how social media platforms are intended to be used, without requiring additional actions to be performed before content is shared. That is, techniques described herein can alleviate the need for a social media platform to establish communication interfaces between disparate platforms yet can offer the ability for sellers to sell items via a social media platform using secure communications. As such, techniques described herein are directed to improvements over existing technologies.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, and sensor(s) 1518.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s)

1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, modules or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider 1412 associated with the server(s) 1504, or which can be an otherwise dedicated application. In some examples, the user interface 1520 can be one of the user interface(s) 122 and/or 124 described above with reference to FIGS. 1 and 2. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other modules and data 1522, which can include programs, drivers, etc., and the data used or created by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1412, described above, to provide one or more services. That is, in some examples, the service provider 1412 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with seller(s) located proximate to the users 1414. In at least one example, location can be used for taking payments from nearby buyers when they leave a geofence, or location can be used to initiate an action responsive to users 1414 enter a brick-and-mortar store of a seller. Location can be used in additional or alternative ways as well.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1526 may also include a biometric sensor to receive and process biometric characteristics and process them as payment instruments, given that such biometric characteristics are registered with the payment processing service provider and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more modules and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one module for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 156, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and creating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single seller or enterprise or can be provided by the servers and/or services of multiple different buyers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program modules, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider 1412 and/or payment processing service. Functional components stored in the computer-readable media 1530 can optionally include a seller module 1536, a training module 1538, and one or more other modules and data 1540.

The seller module 1536 can be configured to receive transaction data from POS systems, such as the POS system 1424 described above with reference to FIG. 14. The seller module 1536 can transmit requests (e.g., authorization, capture, settlement, etc.) to payment service server computing device(s) to facilitate POS transactions between sellers and buyers. The seller module 1536 can communicate the successes or failures of the POS transactions to the POS systems. The payment processing module 116 described above with reference to FIGS. 1 and 2 can correspond to the seller module 1536.

The training module 1538 can be configured to train models using machine-learning mechanisms. For example, a machine-learning mechanism can analyze training data to train a data model that creates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store(s) associated with the user device(s) 1502 and/or the server(s) 1504 for use at a time after the data models have been trained (e.g., at runtime).

The one or more other modules and data 1540 can include the content management module 114 and the payment processing module 116, the functionality of which is described, at least partially, above. Further, the one or more other modules and data 1540 can include programs, drivers, etc., and the data used or created by the functional components. Further, the server(s) 1504 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may create useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. The API(s) 118, described above, can correspond to such.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1502 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include data store(s) 1544 that can be configured to store data that is accessible, manageable, and updatable. In some examples, the data store(s) 1544 can be integrated with the user device 1502 and/or the server(s) 1504. In other examples, as shown in FIG. 15, the data store(s) 1544 can be located remotely from the server(s) 1504 and can be accessible to the server(s) 1504. The data store(s) 1544 can comprise multiple databases and/or servers connected locally and/or remotely via the network(s) 1506. The data store(s) 120, described above with reference to FIGS. 1 and 2, can correspond to the data store(s) 1544.

In at least one example, the data store(s) 1544 can store user profiles, which can include seller profiles, buyer profiles, and so on.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The seller profile can securely store bank account information as provided by the seller. Further, the seller profile can store payment information associated with a payment instrument linked to a stored balance of the seller, such as a stored balance maintained in a ledger by the service provider 1412.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s), described above with reference to FIGS. 1 and 2, can include or be associated with the seller profiles and/or buyer profiles described above.

Furthermore, in at least one example, the data store(s) 1544 can store inventory database(s) and/or catalog database(s). As described above, an inventory can store data associated with a quantity of each item that a seller has available to the seller. The records described above can be stored in the inventory data store. Furthermore, a catalog can store data associated with items that a seller has available for acquisition. The data store(s) 1544 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 2, 14, and 15 for convenience and ease of understanding. However, the methods illustrated are not limited to being performed using components described in FIGS. 1, 2, 14, and 15, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, implemented at least in part by one or more computers of a payment processing service provider, the method comprising:
   analyzing, by the one or more computers of the payment processing service provider and using a machine-trained mechanism, responses to content posted by a first user of a social media service provider, wherein the responses are associated with other users of the social media service provider;
   determining, by the one or more computers of the payment processing service provider and based at least in part on the analyzing, that at least one response of the responses includes an indicator indicating a purchasing intent of a second user with respect to an item depicted in the content;
   creating, by the one or more computers of the payment processing service provider and based at least in part on the at least one response including the indicator indicating the purchasing intent of the second user, a record indicating that the item is available for purchase;
   based at least in part on (i) the record having been created for the item and (ii) the at least one response including the indicator indicating the purchasing intent of the second user:
      accessing, by the one or more computers of the payment processing service provider, payment data associated with the second user; and
      processing, by the one or more computers of the payment processing service provider, a transaction for a cost of the item using at least the payment data.

2. The method as claim 1 recites, wherein the content is associated with an indication that the first user intends to sell the item, and the method further comprises creating the record at a time that the content is posted by the first user or at a second time within a threshold amount of time after the content is posted by the first user.

3. The method as claim 2 recites, further comprising editing the content to include instructions for indicating the purchasing intent with respect to the item, wherein the instructions include at least one of the indicator, a price, or a time after which the item will no longer be for sale.

4. The method as claim 1 recites, wherein the content is not associated with an indication that the first user intends to sell the item, and the method further comprises, prior to creating the record:

sending, based at least in part on the at least one response including the indicator indicating the purchasing intent, a notification that the second user intends to purchase the item to a computing device operable by the first user;

based at least in part on sending the notification to the computing device operable by the first user, receiving, from the computing device operable by the first user, an indication that the first user agrees to list the item for sale; and creating the record based at least in part on receiving the indication that the first user agrees to list the item for sale.

5. A system comprising:

one or more processors; and computer-readable media storing instructions that, when executed by the one or more processors, cause the one or more processors to perform operations comprising:

analyzing, using at least one of an automated program or a machine-trained mechanism, at least one of (i) content posted by a first user of a social media service provider or (ii) one or more responses to the content posted by the first user of the social media service provider, wherein the one or more responses are associated with one or more second users of the social media service provider;

determining, based at least in part on the analyzing, a selling intent of at least the first user or a purchasing intent of the one or more second users to participate in a transaction for an item depicted in the content; and creating, based at least in part on determining the selling intent or the purchasing intent, a record indicating that at least the item depicted in the content is available for purchase by the one or more second users of the social media service provider, wherein the record (i) is created at a time within a threshold amount of time after the content is posted by the first user and (ii) is used for facilitating the transaction.

6. The system as claim 5 recites, the operations further comprising:

determining that the content is associated with the selling intent based at least in part on an indication that the first user intends to sell the item; and creating the record at the time within the threshold amount of time based at least in part on determining that the content is associated with the indication that the first user intends to sell the item, wherein at least a portion of information associated with the record is auto-populated based at least in part on data associated with the first user and other users similar to the first user.

7. The system as claim 5 recites, the operations further comprising:

determining that the content is not associated with the selling intent based at least in part on an indication that the first user does not intend to sell the item;

determining a total number of the one or more responses that include one or more indicators indicating the purchasing intent of the one or more second users to purchase the item depicted in the content;

determining that the total number meets or exceeds a threshold;

sending, based at least in part on the total number meeting or exceeding the threshold, a notification of the purchasing intent of the one or more second users with respect to the item to a computing device operable by the first user;

based at least in part on sending the notification to the computing device operable by the first user, receiving, from the computing device operable by the first user, an indication that the first user agrees to list the item for sale; and creating the record based at least in part on receiving the indication that the first user agrees to list the item for sale.

8. The system as claim 7 recites, wherein the content depicts multiple items and the machine-trained mechanism includes image recognition and natural language processing, and the operations further comprise:

identifying, using the image recognition, each of the multiple items in the content; and determining, using the natural language processing, that the one or more responses including one or more indicators indicating the purchasing intent of the one or more second users to purchase a particular item of the multiple items, wherein the particular item is the item.

9. The system as claim 7 recites, the operations further comprising:

analyzing the one or more responses including the one or more indicators indicating the purchasing intent of the one or more second users to purchase the item depicted in the content to determine a highest price offered for the item; and processing the transaction for the item based at least in part on the highest price offered for the item and information associated with the record.

10. The system as claim 7 recites, the operations further comprising:

editing the content to indicate that the item is available for sale to a highest bidder;

receiving one or more additional responses that include one or more prices at which the one or more second users offer to pay to purchase the item;

analyzing the one or more additional responses to determine a highest price offered for the item; and processing the transaction for the item based at least in part on the highest price offered for the item and information associated with the record.

11. The system as claim 7 recites, the operations further comprising, based at least in part on creating the record, processing the transaction for a second user of the one or more second users, wherein the second user is a first-in-time user of the one or more second users that responded to the content with an indication indicating the purchasing intent.

12. The system as claim 5 recites, the operations further comprising:

determining that the content is not associated with the selling intent based at least in part on an indication that the first user does not intend to sell the item;

determining that at least one response of the one or more responses that includes the indication indicating the purchasing intent of a second user of the one or more second users with respect to the item is associated with a price at which the second user offers to pay to purchase the item;

determining that the price meets or exceeds a threshold;

sending, based at least in part on the price meeting or exceeding the threshold, a notification of the purchasing intent of the second user with respect to the item to a computing device operable by the first user;

based at least in part on sending the notification to the computing device operable by the first user, receiving, from the computing device operable by the first user, an indication that the first user agrees to list the item for sale; and creating the record based at least in part on receiving the indication that the first user agrees to list the item for sale.

13. A method, implemented at least in part by one or more computers of a payment processing service provider, the method comprising:

analyzing, by the one or more computers and using at least one of an automated program implemented over a network or a machine-trained mechanism, at least one of (i) content posted by a first user of a social media service provider or (ii) one or more responses to the content posted by the first user of the social media service provider, wherein the one or more responses are associated with one or more second users of the social media service provider;

determining, by the one or more computers and based at least in part on the analyzing, one of a selling intent of at least the first user or a purchasing intent of the one or more second users to participate in a transaction for an item depicted in the content; and creating, by the one or more computers, a record indicating that at least the item depicted in the content is available for purchase by the one or more second users of the social media service provider, wherein the record (i) is created at a time within a threshold amount of time after the content is posted by the first user and (ii) is used for facilitating the transaction.

14. The method as claim 13 recites, further comprising, based at least in part on (i) the record having been created for the item and (ii) receiving at least one response including an indicator indicating a second purchasing intent of a second user of the one or more second users with respect to the item depicted in the content:

accessing payment data associated with the second user; and processing the transaction for a cost of the item using the payment data and information associated with the record.

15. The method as claim 14 recites, wherein accessing the payment data associated with the second user comprises:

determining that the second user has an account with the payment processing service provider, wherein the account stores the payment data associated with the second user; and accessing the payment data associated with the second user from the account.

16. The method as claim 14 recites, wherein accessing the payment data associated with the second user comprises:

sending, to a computing device operable by the second user, a request for the payment data; and accessing the payment data based at least in part on receiving the payment data responsive to sending the request.

17. The method as claim 13 recites, further comprising:

determining, when the content is posted, that the content is associated with the selling intent based at least in part on an indication that the first user intends to sell the item; and creating the record at the time within the threshold amount of time based at least in part on determining that the content is associated with the indication that the first user intends to sell the item.

18. The method as claim 13 recites, further comprising:

determining, when the content is posted, that the content is not associated with the selling intent based at least in part on an indication that the first user does not intend to sell the item;

determining that one or more responses that include one or more indicators indicating the purchasing intent of the one or more second users to purchase the item depicted in the content satisfies a criterion;

sending, based at least in part on the one or more responses satisfying the criterion, a notification of the purchasing intent of the one or more second users with respect to the item to a computing device operable by the first user;

based at least in part on sending the notification to the computing device operable by the first user, receiving, from the computing device operable by the first user, an indication that the first user agrees to list the item for sale; and creating the record based at least in part on receiving the indication that the first user agrees to list the item for sale.

19. The method as claim 13 recites, further comprising:

determining that two or more responses include one or more indicators indicating a second purchasing intent of two or more second users to purchase the item depicted in the content;

ranking the two or more second users based at least in part on a criterion; and sending, to a computing device operable by a second user of the one or more second users, an offer to purchase the item, wherein the second user is a highest-ranking user of the two or more second users.

20. The method as claim 19 recites, further comprising determining whether the second user accepts the offer to purchase the item within a predetermined period of time, wherein:

if the second user does not accept the offer within the predetermined period of time, sending, to a computing device operable by a third user of the two or more second users, the offer to purchase the item, wherein the third user is a lower-ranking user than the second user; and if the second user accepts the offer within the predetermined period of time:

accessing payment data associated with the second user; and processing a transaction for a cost of the item using the payment data and information associated with the record.

\* \* \* \* \*